US010286405B2

(12) United States Patent
Griffiths et al.

(10) Patent No.: US 10,286,405 B2
(45) Date of Patent: May 14, 2019

(54) AIR CLEANING DEVICE AND APPARATUS

(71) Applicant: Darwin Technology International Limited, Skelmersdale (GB)

(72) Inventors: George Griffiths, Skelmersdale (GB); Geoffrey Norman Walter Gay, Skelmersdale (GB); Mark Gaskell, Skelmersdale (GB)

(73) Assignee: Darwin Technology International Limited, Skelmersdale (GB)

( * ) Notice: Subject to any disclaimer, the term of this patent is extended or adjusted under 35 U.S.C. 154(b) by 193 days.

(21) Appl. No.: 15/298,775

(22) Filed: Oct. 20, 2016

(65) Prior Publication Data

US 2017/0113229 A1 Apr. 27, 2017

(51) Int. Cl.
*B03C 3/155* (2006.01)
*B03C 3/41* (2006.01)
(Continued)

(52) U.S. Cl.
CPC ................ *B03C 3/155* (2013.01); *B03C 3/12* (2013.01); *B03C 3/368* (2013.01); *B03C 3/38* (2013.01);
(Continued)

(58) Field of Classification Search
CPC combination set(s) only.
See application file for complete search history.

(56) References Cited

U.S. PATENT DOCUMENTS 4,533,368 A * 8/1985 Snaddon .................. B03C 3/64 55/472
4,602,921 A * 7/1986 Shinohara .............. B03C 3/019 361/230
(Continued)

FOREIGN PATENT DOCUMENTS

CN 202263644 U 6/2012
CN 203687216 U 7/2014
(Continued)

OTHER PUBLICATIONS

International Search Report and Written Opinion for corresponding Patent Application No. PCT/GB2016/053284 dated Jan. 25, 2017.
(Continued)

*Primary Examiner* — Amber R Orlando
*Assistant Examiner* — Sonji Turner
(74) *Attorney, Agent, or Firm* — Renner, Otto, Boisselle & Sklar, LLP

(57) ABSTRACT

An air cleaning device for removing aerosol particles from an air stream comprising: a particle charger comprising a housing and an electrode arrangement therein for generating air ions in the air stream, the particle charger having a particle charging zone within which, in use, aerosol particles in the air stream are electrically charged via collision with the air ions; a filter for precipitating electrically charged aerosol particles from the air stream moving through the device; and an air mover, comprising a casing, for moving the air stream through the device; wherein the particle charger and the air mover are provided upstream of the filter;
(Continued)

and wherein the housing of the particle charger is hermetically sealed to the casing of the air mover in the direction of air flow through the device, such that the particle charger and the air mover are intimately coupled together, whereby all air entering the device has to pass through both the particle charger and the air mover.

16 Claims, 15 Drawing Sheets

(51) Int. Cl.
*B03C 3/38* (2006.01)
*B03C 3/12* (2006.01)
*B03C 3/36* (2006.01)
*F24F 3/16* (2006.01)

(52) U.S. Cl.
CPC ................ *B03C 3/41* (2013.01); *F24F 3/166* (2013.01); *B03C 2201/04* (2013.01); *B03C 2201/06* (2013.01); *F24F 2003/1682* (2013.01)

(56) References Cited

U.S. PATENT DOCUMENTS

| | | | | | |
|---|---|---|---|---|---|
| 4,654,054 | A * | 3/1987 | Snaddon | B03C 3/64 | 96/68 |
| 4,715,870 | A * | 12/1987 | Masuda | B03C 3/155 | 96/67 |
| 5,456,741 | A * | 10/1995 | Takahara | B03C 3/12 | 95/6 |
| 5,993,521 | A * | 11/1999 | Loreth | B03C 3/12 | 96/69 |
| 6,203,600 | B1 * | 3/2001 | Loreth | B03C 3/49 | 264/280 |
| 6,364,935 | B1 * | 4/2002 | Wennerstrom | B03C 3/155 | 55/528 |
| 6,398,852 | B1 * | 6/2002 | Loreth | B03C 3/32 | 55/498 |
| 6,749,669 | B1 * | 6/2004 | Griffiths | B03C 3/14 | 55/DIG. 38 |
| 6,758,884 | B2 * | 7/2004 | Zhang | B03C 3/12 | 96/50 |
| 6,790,259 | B2 * | 9/2004 | Rittri | B03C 3/09 | 95/78 |
| 6,989,051 | B2 * | 1/2006 | Parisi | B03C 3/155 | 96/67 |
| 7,008,469 | B2 * | 3/2006 | Vetter | B03C 3/32 | 96/67 |
| 7,141,098 | B2 * | 11/2006 | Zhang | B03C 3/12 | 96/62 |
| 7,156,898 | B2 * | 1/2007 | Jaisinghani | B03C 3/09 | 264/257 |
| 7,258,715 | B2 * | 8/2007 | Cox | B03C 3/09 | 55/422 |
| 7,601,204 | B2 * | 10/2009 | Woodruff | B03C 3/017 | 95/73 |
| 7,655,076 | B2 * | 2/2010 | Griffiths | B03C 3/011 | 96/64 |
| 7,815,720 | B2 * | 10/2010 | McKinney | B03C 3/09 | 96/63 |
| 7,896,957 | B2 * | 3/2011 | Zhao | B03C 3/155 | 96/63 |
| 7,942,952 | B2 * | 5/2011 | Gale | B03C 3/08 | 96/63 |
| 8,123,840 | B2 * | 2/2012 | Marra | B03C 3/09 | 95/59 |
| 8,465,574 | B2 * | 6/2013 | Horne | A47L 9/10 | 55/DIG. 1 |
| 2004/0025695 | A1 | 2/2004 | Zhang et al. | | |
| 2004/0074387 | A1 * | 4/2004 | Jaisinghani | B03C 3/09 | 95/63 |
| 2004/0151617 | A1 * | 8/2004 | Zanakis | A61L 9/145 | 422/4 |
| 2006/0150816 | A1 * | 7/2006 | Jaisinghani | B03C 3/09 | 96/67 |
| 2008/0156186 | A1 * | 7/2008 | McKinney | B03C 3/09 | 95/2 |
| 2010/0077924 | A1 * | 4/2010 | Zhao | B03C 3/155 | 96/80 |
| 2011/0171094 | A1 * | 7/2011 | Zahedi | B01D 53/323 | 423/245.1 |

FOREIGN PATENT DOCUMENTS

| | | | | |
|---|---|---|---|---|
| GB | 2 308 320 | A | 6/1997 | |
| GB | 2308320 | A * | 6/1997 | B03C 3/155 |
| KR | 20080024593 | A | 3/2008 | |
| WO | 97/23294 | | 7/1997 | |
| WO | 00/61293 | | 10/2000 | |
| WO | WO 2005/102534 | | 11/2005 | |
| WO | 2014/204310 | A1 | 12/2014 | |

OTHER PUBLICATIONS

Combined Search and Examination Report for corresponding United Kingdom Patent Application No. 1518713.1 dated Nov. 24, 2015.

* cited by examiner

AIR CLEANING DEVICE AND APPARATUS

This application claims priority of United Kingdom Application No. 1518713.1 filed Oct. 22, 2015, which is hereby incorporated herein by reference.

The present invention relates to an air cleaning device and an air cleaning apparatus. The invention relates more particularly, but not necessarily exclusively, to an electrostatic precipitation device and to an electrostatic air cleaning apparatus, both for use in air cleaning and filtration.

BACKGROUND

Air cleaning and other air filtration devices and apparatus are used to remove unwanted aerosol particles from air. Typically, air filtration is achieved using a filter component configured to entrap aerosol particles from air as it passes through the filter.

Electrostatic precipitation air cleaning devices and apparatus operate by transferring an electric charge to aerosol particles in the air prior to their passage through the filter or particle collector component thereof (hereinafter collectively referred to as a "filter" for simplicity). An electric field may be applied to the filter, such that said electrically charged particles are attracted to, and precipitated onto, a surface of the filter during passage through the device/apparatus, thereby effecting removal of the particles from the passing air stream with greater efficiency as compared to removal of uncharged aerosol particles.

Electric charging of the particles can be achieved in a number of ways. One such way, utilising a "field charger", is typically used in filtration applications. A field charger comprises a particle charger, which comprises an emission electrode and a counter-electrode, which together are operable to form a particle charging zone. In use, an electric field is established between the emission electrode and its counter-electrode because of the difference in their respective electrical potentials: the emission electrode is typically of a small radius of curvature, e.g. it may be in the form of a fine conducting wire or sharp conducting pin, and is usually raised to a high voltage as compared to the counter-electrode, which is typically held at earthed potential. Such an arrangement leads to corona discharge at the emission electrode within the field charger (care being taken to ensure that the voltage difference between the electrodes does not cause electrical breakdown and lead to electrical arcing between the electrodes). Air ions created by the corona discharge are accelerated by the electrical field and collide with aerosol particles passing through the particle charging zone, resulting in those particles becoming electrically charged.

Prior art electrostatic air filtration devices and apparatus most commonly incorporate an array of thin wires (of the order of millimeters in diameter) as the emission electrodes in the field chargers therein. Such wire arrays form a corona discharge around every wire in the array and, therefore, can be shaped to fit numerous applications. However, wire arrays can be hindered by deposition of unwanted, deleterious substances on the wires, impacting charging effectiveness. Additionally, emission of ozone can be undesirably high from coronas supported on wires. Furthermore, because the wires have to be attached to supporting framework, in the regions of the ends of the wires where attachment occurs, corona emission is reduced to the extent that aerosol particles in the air flowing past the ends of the wires are not effectively charged, which ultimately leads to reduced aerosol particle collection efficiency. This "charge bypass" effect is usually exacerbated by the relative loose-fitting of the framework containing the wire array into surrounding housing defining the flow path of air to be filtered passing through the device or apparatus.

Also known for use in field chargers, although much less commonly (indeed perhaps only by the present applicant), are "pin-type" emission electrodes. As compared to a wire array electrode, a pin-type electrode forms a corona only in a relatively small volume around its sharp tip. The corona intensity at the tip of a pin-type electrode is higher as compared to the corona intensity of a wire array electrode for a given applied current because of the physical differences between the two—the electron concentration at a sharp (diminishing) point is greater than the electron concentration in a wire of substantially constant cross-section, which improves particle charging effectiveness. Furthermore, a pin-type emission electrode produces less ozone for a given particle charging capacity as compared to a wire array equivalent because the corona distributed along a wire requires more electrical current than a pin-type corona and ozone production is proportional to said electrical current. Moreover, as compared to wire array electrodes, pin-type electrodes are less affected by deposition of substances which might otherwise hinder corona discharge, the reason for this being two-fold: firstly, the surface area of the sharp tip of a pin is much less than that of the surface of a wire (around both of which corona discharge occurs) and thus less deposition of corona-hindering substances can occur, and secondly, the higher intensity of the corona at the pin tip as compared to the corona along the length of the wire leads to a greater air ion flux at the pin tip which assists with prevention of deposition of, and flushing away of deposited, corona-hindering substances. Additionally, because a pin-type electrode does not have to be attached to surrounding framework in the same manner as is required for the wires of a wire array electrode, there are no regions of reduced corona emission with pin-type electrodes, which leads to a higher proportion of aerosol particles being charged (as compared to with a wire array electrode). Thus, despite the greater prevalence of wire array emission electrodes in known field chargers, the use of a pin-type emission electrode in a field charger offers many advantages over and above those achievable with otherwise equivalent field chargers which incorporate wire array emission electrodes.

With either type of air cleaning device (i.e. using a wire array electrode or a pin-type electrode in the field charger), an air mover, for example a fan, is typically incorporated to urge uncleaned air to pass through the device. A usual arrangement of components in an air cleaner is, in the direction of airflow: particle charger, filter, air mover. Such a prior art arrangement is shown schematically in FIGS. 1 to 3 of the accompanying drawings, which is typical of the air cleaning arrangement in a prior art portable air cleaning device.

Referring to FIGS. 1 to 3, there is shown therein a prior art, portable electrostatic precipitation device 10 for removing unwanted aerosol particles from an air stream. The electrostatic precipitation air cleaning device 10 comprises a particle charger 12, an air mover 15 in the form of a mechanical fan, and a filter 16 for removing charged aerosol particles from the air stream ("dirty air") (not shown) as it flows through the device 10 via an inlet 17 at the entrance to the particle charger 12, in the direction of arrow A, through the filter 16, to an outlet 18 downstream of the fan 15. FIGS. 2 and 3 show an inlet grille 19*a* and an outlet grille 19*b*, which are fitted to the inlet 17 and the outlet 18 respectively formed in a housing 101 which surrounds and accommodates all of the aforementioned components of the device 10.

The particle charger 12 comprises a pin-type electrode in the form of a pin 13 (represented by an arrow, the head of which points upstream to represent the tip of the pin) mounted centrally along the length of a diametric bar 13*a* (shown only in FIGS. 2 and 3) relative to a counter-electrode 14 so as to enable corona discharge from the tip of the pin and the generation of air ions for charging aerosol particles in the air stream in the manner discussed earlier in this specification. As shown clearly in FIGS. 1 and 2, the particle charger 12 and the filter 16 are provided upstream of the fan 15 with significant spatial separation or gaps, labelled G, between each of these components.

FIGS. 1 to 3 show that the device 10 undergoes two changes in its cross-sectional area between the inlet 17 and the outlet 18, in the region of the gaps G, illustrated by the dotted lines shown joining, firstly, the particle charger 12 to the filter 16, and secondly, the filter 16 to the fan 15. Once dirty air to be cleaned has passed through the particle charger 12, it experiences an expansion in cross-sectional area through which it can flow until it reaches the filter 16, which has a larger cross-section (perpendicular to airflow) than the particle charger 12. Downstream of the filter 16, cleaned air experiences a contraction in cross-sectional area through which it can flow to accommodate the fan 15, which has a smaller cross-section (again perpendicular to airflow) than the filter 16. The changes in cross-sectional area in the gaps G between the particle charger 12 and the filter 16, and between the filter 16 and the fan 15, result in unwanted air turbulence, greater air resistance, high energy consumption and noise.

To overcome at least one of the described mis-matches of cross-sectional area, it is known in the prior art to replace a single pin-type electrode with an array of multiple pin-type electrodes, each surrounded by an earthed counter-electrode, in order to substantially match the area of the filter to the area of the particle charger, the fan being on the opposite side of the filter to the particle charger (in the same manner as is shown in FIGS. 1 to 3).

Such an arrangement is described in, for example, WO2005/102534. However, in addition to the disadvantages of the pin array electrode being more expensive to fabricate than a single pin-type electrode and leading to the production of more ozone as compared to a single pin-type electrode, the spatial separation or gaps between the three components (particle charger, filter and fan) discussed in relation to the device shown in FIGS. 1 to 3 still exist, and the problems of unwanted air turbulence, greater air resistance, high energy consumption, noise and the need for tapered cowling/ducting remain. Indeed, such an array of multiple pin-type electrodes must be spatially separated from the filter in the device because, if placed too close to the filter, any air ion flux grounding on the filter rather than the earthed counter-electrode of the field charger can interfere with the filter operation, significantly reducing its efficiency. Moreover, as the region between the field charger and the filter is under negative pressure with respect to the ambient air when the device is in use, there is an increased possibility that air may bypass the pin-type electrodes, leaking into the region separating the array from the filter. Such "charge bypass" is detrimental as it typically leads to uncharged aerosol particles in the air entering the filter, thereby reducing particle capture efficiency.

Furthermore, a means of bridging the gaps G between the particle charger 12 and filter 16, and between the filter 16 and air mover 15, is required: often expensive, tapered cowling or ducting must be provided to overcome the mismatch in cross-sectional areas and the spatial separation of the components, for example in the form of housing 101. As can be clearly seen in FIGS. 2 and 3, the device does not exhibit 100% particle capture efficiency, or rather, the efficiency of the device 10 cannot match the intrinsic efficiency of the filter 16 because of the two significant areas of bypass that exist with the arrangement shown. In particular, some dirty air is able to bypass the particle charger 12 ("charge bypass") as shown by arrows labelled B1 and thus, because the aerosol particles therein are not charged, they are not removed from the air stream by the filter 16. Secondly, dirty air, whether or not containing charged aerosol particles, is able to bypass the filter 16 ("filtration bypass") as shown by arrows labelled B2, and thus is not cleaned.

In order to achieve high efficiency of particle collection in the filter 16, the charge bypass airflow around the particle charger 12 must be a small proportion of the total air flow through the device 10. Any aerosol particles escaping charging will tend to pass through the electrostatic filter 18 at low efficiency. For example, in an air cleaning device operating at a particle collection efficiency above 99.99% (very high efficiency), less than one part in 100,000 of the total air flow can be allowed to bypass the particle charger.

As mentioned earlier, the effect of such charge bypass and filtration bypass is exacerbated when the fan 15 is located downstream of both the particle charger 12 and the filter 16 because air is subjected to a negative air pressure compared to the surrounding atmosphere. However, because the air filter 16 is designed to be removed from the device 10 for replacement or cleaning and therefore the fit between the frame of the filter 16 and the surrounding housing 101 is necessarily a sliding fit, filtration bypass often inevitably results. Consequently, unfiltered bypass air flow (denoted by the thinner arrows B2) is able to mix with filtered air (denoted by the thicker arrows) in a region (T) of turbulent airflow found upstream of, and adjacent to, the fan 15, which reduces the purity of the air (denoted by mixed thickness arrows M) issuing from the outlet 18 and outlet grille 19*b* of the device 10 across the entire outflow cross-sectional area, as shown in FIG. 3.

A usual arrangement of components that can be found in typical, prior art air cleaning apparatus, for example an HVAC system, are shown schematically in FIGS. 4 to 7 of the accompanying drawings.

Referring to FIGS. 4 and 5, there is shown therein a prior art electrostatic precipitation apparatus 100 for removing unwanted aerosol particles from an air stream. The electrostatic precipitation air cleaning apparatus 100 comprises an air mover 115 in the form of a mechanical fan, a particle charger 112, and a filter 116 for removing charged aerosol particles from the air stream ("dirty air") (not shown) as it flows through the apparatus 100 in the volume defined by ductwork 119, in the direction of arrow A, through the filter 116, to an outlet (not shown) downstream of the fan 115.

The particle charger 112 comprises an array of pin-type electrodes in the form of an array of pins 113 mounted in a frame 113*a* coupled to an array of circular counter-electrodes 113*b* formed in an adjacent plate 113*c*, so as to enable corona discharge from the tip of each of the pins 113 and the generation of air ions for charging aerosol particles in the air stream in the manner discussed earlier in this specification. As shown clearly in FIGS. 4 and 5, the particle charger 112 and the filter 116 are provided downstream of the fan 115.

Regardless of whether said components are spaced from one another or whether they are intimately coupled, because of an intrinsic spatial tolerance designed into each of the particle charger 112 and the filter 116 so as to allow each to be removably fitted into the ductwork 119, in the absence of any specific high performance sealing means, such as expensive gaskets, there inevitably exists a pathway for both charge bypass and filtration bypass around the particle charger 112 and the filter 116 respectively.

As can be clearly seen in FIG. 5, the apparatus 100 does not exhibit 100% particle capture efficiency, or rather, the efficiency of the apparatus 100 cannot match the intrinsic efficiency of the filter 116 because of these two significant areas of bypass. In particular, some dirty air is able to bypass the particle charger 112 ("charge bypass") as shown by arrows labelled B1 and thus, because the aerosol particles therein are not charged, they are not removed from the air stream by the filter 116. Secondly, dirty air, whether or not containing charged aerosol particles, is able to bypass the filter 116 ("filtration bypass") as shown by arrows labelled B2, and thus is not cleaned.

The prior art arrangement shown in FIGS. 6 and 7 is identical to the prior art arrangement shown in FIGS. 4 and 5, except for the relative order of the particle charger, filter and air mover in the direction of air flow. Thus in FIGS. 6 and 7 all like components are provided with like reference numerals to those used in FIGS. 4 and 5, but raised by 100. In particular, the particle charger 212 and the filter 216 are both provided upstream of the air mover 215, as compared to the direction of air flow, defined by arrow A.

Regardless of whether said components are spaced from one another or whether they are intimately coupled, again because of an intrinsic spatial tolerance designed into each of the particle charger 212 and the filter 216 so as to allow each to be removably fitted into the ductwork 219, in the absence of any specific high performance sealing means, such as expensive gaskets, there inevitably exists a pathway for both charge bypass and filtration bypass around the particle charger 212 and the filter 216 respectively.

As can be clearly seen in FIG. 7, the apparatus 200 does not exhibit 100% particle capture efficiency, or rather, the efficiency of the apparatus 200 cannot match the intrinsic efficiency of the filter 216 because of these two significant areas of bypass. In particular, some dirty air is able to bypass the particle charger 212 ("charge bypass") as shown by arrows labelled B1 and thus, because the aerosol particles therein are not charged, they are not removed from the air stream by the filter 216. Secondly, dirty air, whether or not containing charged aerosol particles, is able to bypass the filter 216 ("filtration bypass") as shown by arrows labelled B2, and thus is not cleaned.

The air cleaning efficiency of such an apparatus has been calculated based on the following assumptions and criteria:

Typical ductwork utilised in, for example, HVAC installations, is inevitably flexible, being fabricated from sheet metal. Measurements of deflection under finger-pressures in the region of 2.3 to 6.8 kg (5 to 15 lbs) weight applied externally to the centre of the duct side-wall were measured in three typical domestic HVAC installations. The charge bypass areas for each duct wall under deflection were also calculated and expressed as a % of the total duct un-deflected area. The results are shown in Table 1 below.

TABLE 1

| | Duct Width | Duct Depth | Duct Area ($mm^2$) | Bypass Area ($mm^2$) | % Bypass |
|---|---|---|---|---|---|
| HVAC 1 | | | | | |
| Duct 1-Dimensions (mm) | 254 | 609.6 | 154838.4 | | |
| Duct 1-Deflection (mm) | 3 | 7 | | 5029.2 | 3.25 |
| Duct 1-Force (kg) | 6.8 | 6.8 | | | |
| Duct 2-Dimensions (mm) | 254 | 254 | 64516 | | |
| Duct 2-Deflection (mm) | 5 | 5 | | 2540 | 3.94 |
| Duct 2-Force (kg) | 6.8 | 6.8 | | | |
| HVAC 2 | | | | | |
| Duct 1-Dimensions (mm) | 254 | 254 | 64516 | | |
| Duct 1-Deflection (mm) | 3 | 5 | | 2032 | 3.15 |
| Duct 1-Force (kg) | 4.5 | 4.5 | | | |
| Duct 2-Dimensions (mm) | 254 | 254 | 64516 | | |
| Duct 2-Deflection (mm) | 5 | 6 | | 2794 | 4.33 |
| Duct 2-Force (kg) | 6.8 | 6.8 | | | |
| HVAC 3 | | | | | |
| Duct 1-Dimensions (mm) | 254 | 254 | 64516 | | |
| Duct 1-Deflection (mm) | 5 | 5 | | 2540 | 3.94 |
| Duct 1-Force (kg) | 4.5 | 4.5 | | | |
| Duct 2-Dimensions (mm) | 254 | 254 | 64516 | | |
| Duct 2-Deflection (mm) | 5 | 7 | | 3048 | 4.72 |
| Duct 2-Force (kg) | 2.3 | 4.5 | | | |
| Duct 3-Dimensions (mm) | 254 | 254 | 64516 | | |
| Duct 3-Deflection (mm) | 7 | 3 | | 2540 | 3.94 |
| Duct 3-Force (kg) | 4.5 | 6.8 | | | |

It can be seen that the resulting deflections were in the range of 3 mm to 7 mm. Taking each deflection and assuming an average bypass gap along each frame length of 50% of the deflection, the resulting bypass area for four sides of the entire rectangular duct when compared to the total cross-sectional area can be calculated.

Assuming that the air flow distributes proportionally to the cross sectional areas of the bypass and un-deflected duct, the bypass flow averages 3.9% over the examples above. This represents a bypass of 3,900 parts per 100,000 of total air flow and would reduce the maximum achievable efficiency to 96.1%, which is far lower than desired.

Ductwork can, of course, be strengthened with ribs and brackets or even by the insertion of a purpose made cabinet, however such modifications are difficult and expensive, and still require high quality sealing around the particle charger frame to the interior walls of the surrounding duct.

It is an object of the present invention to obviate or mitigate some, or preferably all, of the abovementioned disadvantages, particularly in relation to charge bypass.

SUMMARY OF THE INVENTION

Furthermore, there is a need for a personal air cleaner (air cleaning device) which can deliver pure air, essentially free of all particles, (meaning a typical air cleaning efficiency of 99.9%), directly into the immediate breathable atmosphere of a user. It is known that some individuals have a great sensitivity to aerosol particles (including dust particles and other allergens) and suffer ill-health when exposed to certain types of particle. For example, a single pollen particle can in some individuals trigger a severe allergic response. With an air cleaner designed to deliver pure air with a 99.9% particle removal efficiency, at the air cleaner outlet, a user can gain the full benefits of breathing contaminant-particle-free air.

It is therefore a further object of the present invention to eliminate the disadvantages of previous air cleaners, particularly personal air cleaners.

According to a first aspect of the present invention there is provided an air cleaning device for removing aerosol particles from an air stream, the device comprising:

(a) a particle charger comprising a housing and an electrode arrangement therein for generating air ions in the air stream, the particle charger having a particle charging zone within which, in use, aerosol particles in the air stream are electrically charged via collision with the air ions;

(b) a filter for precipitating electrically charged aerosol particles from the air stream moving through the device; and (c) an air mover, comprising a casing, for moving the air stream through the device;

wherein the particle charger and the air mover are provided upstream of the filter; and wherein the housing of the particle charger is hermetically sealed to the casing of the air mover in the direction of air flow through the device, such that the particle charger and the air mover are intimately coupled together, whereby all air entering the device has to pass through both the particle charger and the air mover.

Such a device ensures that charge bypass is eliminated because ALL of the air entering the device MUST pass through the particle charging zone, meaning all aerosol particles in the air stream must also pass through the particle charging zone, where electrical charging via collision with air ions occurs. This is made possible because the housing of the particle charger and the casing of the air mover together define the volume through which the air stream must flow in order to pass through the filter—no additional surrounding housing, cowling or ductwork is required. Furthermore, with such a device, pure air with a 99.9% particle removal efficiency, can be delivered at the device outlet, such that a user can gain the full benefits of breathing contaminant-particle-free air.

For the avoidance of any doubt, reference to the housing of the particle charger being hermetically sealed to the casing of the air mover "in the direction of air flow through the device" indicates the sequence of the hermetic seal between the particle charger and the air mover; in other words, when viewed in the direction of air flow through the device, either the particle charger is hermetically sealed to, and is located upstream of, the air mover, or, the particle charger is hermetically sealed to, and is located downstream of, the air mover.

Said device is preferably portable and thus can function as a standalone air cleaner.

According to a second aspect of the present invention there is provided an alternative air cleaning device for removing aerosol particles from an air stream, the device comprising:

(a) an air mover, comprising a casing, for moving the air stream through the device, wherein the casing has an air inlet portion and an air outlet portion, either one of which comprises a first part of an electrode arrangement for generating air ions in the air stream;

(b) a particle charger comprising a second part of the electrode arrangement for generating air ions in the air stream, wherein, together, the particle charger and whichever one of the air inlet portion and the air outlet portion of the casing of the air mover that comprises the first part of the electrode arrangement define a particle charging zone within which, in use, aerosol particles in the air stream are electrically charged via collision with the air ions; and (c) a filter for precipitating electrically charged aerosol particles from the air stream moving through the device;

wherein the particle charger and the air mover are provided upstream of the filter; and wherein the particle charger is accommodated by, and hermetically sealed to, the air inlet/outlet portion of the casing of the air mover in the direction of air flow through the device, such that the particle charger and the air mover are intimately coupled together, whereby all air entering the device has to pass through both the particle charger and the air mover.

Again, such a device ensures that charge bypass is eliminated because ALL of the air entering the device MUST pass through the particle charging zone, meaning all aerosol particles in the air stream must also pass through the particle charging zone, where electrical charging via collision with air ions occurs. This is made possible because the air inlet/outlet portion of the air mover, within which the particle charger is accommodated, defines the volume through which the air stream must flow in order to pass through the filter—no additional surrounding housing, cowling or ductwork is required.

For the avoidance of any doubt, reference to the particle charger being accommodated by, and hermetically sealed to, the air inlet/outlet portion of the air mover "in the direction of air flow through the device" indicates the sequence of the hermetic seal between the particle charger and the air mover; in other words, when viewed in the direction of air flow through the device, either the particle charger is hermetically sealed to, and is located at the upstream end of, the air mover, or, the particle charger is hermetically sealed to, and is located at the downstream end of, the air mover.

According to a third aspect of the present invention there is provided an air cleaning apparatus for removing aerosol particles from an air stream, the apparatus comprising:

(a) a housing comprising a first part of an electrode arrangement for generating air ions in the air stream;

(b) a particle charger, located in the housing, and comprising a second part of the electrode arrangement for generating air ions in the air stream, wherein, together, the particle charger and the housing define a particle charging zone within which, in use, aerosol particles in the air stream are electrically charged via collision with the air ions;

(c) a filter, located in the housing, for precipitating electrically charged aerosol particles from the air stream moving through the apparatus; and (d) an air mover, located in the housing, for moving the air stream through the apparatus;

wherein the particle charger and the air mover are provided upstream of the filter; and wherein the housing provides a hermetic seal between the particle charger and the air mover in the direction of air flow through the apparatus, such that the particle charger and the air mover are intimately coupled together, whereby all air entering the apparatus has to pass through both the particle charger and the air mover.

Such an apparatus ensures that charge bypass is eliminated because all of the air entering the apparatus must pass through the particle charging zone, meaning all aerosol particles in the air stream must also pass through the particle charging zone, where electrical charging via collision with air ions occurs. This is made possible because the housing of the apparatus, the particle charger and the air mover together define the volume through which the air stream must flow in order to pass through the filter—no additional surrounding housing, cowling or ductwork is required.

For the avoidance of any doubt, reference to the housing providing a hermetic seal between the particle charger and the air mover “in the direction of air flow through the apparatus” indicates the sequence of the hermetic seal between the particle charger and the air mover; in other words, when viewed in the direction of air flow through the device, either the particle charger is hermetically sealed to, and is located upstream of, the air mover, or, the particle charger is hermetically sealed to, and is located downstream of, the air mover. In each of the aforementioned aspects of the invention, the particle charger and the air mover may be intimately coupled, i.e. hermetically sealed, as particle charger/air mover in the direction of air flow (such that the particle charger is upstream of the air mover) or as air mover/particle charger (such that the air mover is upstream of the particle charger)—in both instances, the “couple” is upstream of the filter.

In the air cleaning device according to the first aspect of the invention, the housing of the particle charger has an inlet and an outlet, and the casing of the air mover has an inlet and an outlet, such that the intimate couple may be achieved by a hermetic seal of the outlet of the housing of the particle charger to the inlet of the casing of the air mover, or, it may be achieved by a hermetic seal of the outlet of the casing of the air mover to the inlet of the housing of the particle charger. This is achieved in practice by provided said “sealing parts” with a common cross-sectional area with a high degree of accuracy (of the order of ±0.127 to 0.508 mm (±5 to 20 thousandths of an inch)). Although cylindrical, or substantially cylindrical, common cross-sectional areas may be preferred, it is within the scope of the invention for the common cross-sectional area to be of any shape, e.g. oval or polygonal, such as octagonal or hexagonal.

In the air cleaning device according to the second aspect of the invention, the air mover has an air inlet portion and an air outlet portion, within either one of which the particle charger may be intimately coupled, by means of a hermetic seal.

In the air cleaning apparatus of the third aspect of the invention, the housing accommodates all of the components, such that the particle charging zone defined by it and the particle charger is effectively hermetically sealed to the air mover, whether the air mover is provided upstream or downstream of the particle charger.

In use, air flowing through the air cleaning device and air cleaning apparatus flows along an air stream passage and through a volume from an air inlet of the device or apparatus to an air outlet of the device or apparatus. The air inlet of the device/apparatus may be provided at the inlet end of the intimate couple, i.e. at whichever of the particle charger and air mover is upstream in the couple. The air outlet of the device/apparatus may be provided at the downstream end of the filter.

Throughout this specification, when a first component is described as being “upstream” of a second component, it is intended to mean that the first component is provided further towards the air inlet of the device/apparatus than the second component. Put another way, in use, air will flow past a first component before a second component if the first component is upstream of the second component. The term “downstream” should be construed accordingly.

A further advantage of the present invention resides in the altered positioning of components relative to one another as compared to the conventional ordering of such components. In particular, in relation to the first and third aspects of the invention, since both the particle charger and the air mover are provided upstream of the filter, it is possible to reduce the number of changes in cross-sectional area of the air stream to one, or potentially eliminate changes in cross-section altogether.

As a result of both the intimate coupling of the particle charger and the air mover with the unconventional ordering of the components discussed above, the present invention may ameliorate or mitigate the aforementioned disadvantages in terms of turbulence, higher air resistance, greater energy consumption, noise, and in particular the problem of charge bypass or leakage. By extension, it may also remove or reduce what appears to be an industry bias against using pin-type emission electrodes (as opposed to wire array emission electrodes) in field chargers used in air cleaning devices. This may ameliorate issues with ozone generation and the deposition of substances on the wire emission electrodes observed when wire arrays are used in field chargers, while providing for a higher efficiency of particle charging per unit of corona current in a pin-type emission electrode as compared with that achievable with a wire array electrode (for a given applied current).

Any suitable filter for capturing charged aerosol particles may be used in an air cleaning device of the invention. In one preferred embodiment, the filter may be an electrostatic filter, which operates by using an electric field to deflect charged aerosol particles passing therethrough in order to cause those particles to be precipitated onto a filter surface. In another preferred embodiment the filter may be an electret filter. In yet another preferred embodiment of the invention, the filter may be an electrostatic precipitator. Such filters are well known to those of skill in the art.

As described in International patent publication WO00/61293, for example, an electrostatic filter can comprise an array of passages which forms part of the fluid passage through the electrostatic precipitation device and through which a gas stream can pass relatively freely (the passages being provided between plastics walls and the plastics walls having areas of conductive material in contact therewith), and means for applying high and low electrical potentials alternately to isolated areas of the conductive material to provide charged sites in the array for collecting particles from the gas stream. Use of this particular type of filter with the air cleaning device of the first aspect of the invention may provide particular benefits in that such a filter tends to collimate the air flow therethrough, thus maximising the availability of laminar air flow exiting the device to a user, with any air that has been subject to filtration bypass being confined to the peripheral region of the overall flow of air exiting the device, such that it does not mix and contaminate purified air exiting the filter.

An electret filter may comprise an array of layers of fluted plastics sheet material or it may be formed of fibrous media, in which the fibres may be charged by electrodes in the filter or during manufacture of the filter.

Alternative configurations for the filter component are well known to those of skill in the art and any appropriate filter may form part of an electrostatic precipitation air cleaning device according to the present invention.

The air mover may take the form of any conventional component well known to those of skill in the art for effecting urging (or movement) of air in a desired direction. The air mover may, for example, take the form of a mechanical fan, bellows or a convective airflow device. Such an air mover is particularly useful in the first and third aspects of the invention. Alternatively, the air mover may take the form of a centrifugal fan, also known as a “blower”. Such an air mover is particularly useful in the second aspect of the invention. Many other suitable components would be well known to those of skill in the art and any appropriate air mover may form part of an electrostatic precipitation air cleaning device according to the present invention.

The electrode arrangement comprised in each of the air cleaning devices and the air cleaning apparatus according to the invention comprises two parts: an electrode and a counter-electrode. In the air cleaning device of the first aspect, the particle charger comprises both the electrode and the counter-electrode. In the air cleaning device of the second aspect, the first part of the electrode arrangement comprised in the air inlet/outlet portion of the casing of the air mover preferably may be the counter-electrode, whilst the second part of the electrode arrangement comprised in the particle charger preferably may be the electrode. In the air cleaning apparatus of the third aspect, the first part of the electrode arrangement comprised in the housing preferably may be the counter-electrode, whilst the second part of the electrode arrangement preferably may be the electrode.

The electrode may be in the form of a pin or elongate wire—each having a tip or end—and may be supported on a support rod, which may additionally be conductive. Two or more electrodes may be supported on a support rod. In all cases, the electrode is capable of corona discharge, as described earlier in this specification. The counter-electrode (non-corona) may be configured to be operable at a different electrical potential to that of the (corona) electrode in the electrode arrangement. In both the device and the apparatus, the counter-electrode will surround the tip/end of the electrode but will be separated therefrom by a clearance. The counter-electrode may be earthed. Provision of a counter-electrode provides a potential gradient of sufficient strength to ignite the corona discharge required to generate air ions. Furthermore, the resulting electric field accelerates the air ions generated so that they cross the space in the field charger through which air to be cleaned (containing unwanted aerosol particles) passes; as said aerosol particles collide with air ions, charge is transferred from the air ions to the aerosol particles, thus enabling subsequent collection of the aerosol particles by the filter.

The counter-electrode may be shaped such that the distance from the tip/end of the electrode to the surface of the surrounding counter-electrode is approximately constant around the periphery of the tip/end; the air ion flux generated at the tip/end will thus be substantially symmetrical and radial, ensuring that a very high proportion (99.99% is regularly achievable) of the unwanted aerosol particles in the air collide with air ions, leading to the desired charge transfer and subsequent particle capture.

In the air cleaning device of the first aspect of the invention, the counter-electrode may comprise a conductive plate (preferably, but not necessarily, a substantially flat plate) having an aperture therein. Alternatively, the counter-electrode may comprise a hollow cylinder, which may be formed of a conductive material, or which may be provided with a conductive interior surface. The aperture in the plate or the cross-section of the cylinder may be rectangular, square, circular or elliptical, and will have a central longitudinal axis extending orthogonal to the plate or co-extensive with the cylinder. In any of these embodiments, the tip/end of the electrode preferably lies substantially co-axial with the axis of the aperture/cylinder, and is preferably centrally disposed within the aperture in the plate or within the cylinder to ensure that the clearance is approximately constant around the periphery of the tip/end of the electrode.

More preferably, the counter-electrode of the air cleaning device of the first and second aspects of the invention may be generally annular, i.e. the aperture in the conductive plate may be circular or the hollow cylinder may have a circular cross-section. Most preferably, in the first aspect of the invention, the housing of the particle charger of the air cleaning device may comprise the counter-electrode, or alternatively, may form the counter-electrode. An interior surface of the housing of the particle charger, preferably an interior surface adjacent to the electrode, may be provided with an electrically conductive coating or layer which functions as the counter-electrode. Alternatively, the housing may be formed of a suitably electrically conductive material, suitably insulated from external components. The tip/end of the electrode may be substantially concentric with the counter-electrode. In the second aspect of the invention, particularly when the air mover takes the form of a blower having an air intake and an air outlet perpendicular to the intake, the (corona) emission electrode may be provided in the air intake of the blower. The counter-electrode (non-corona) may also be located in the air intake of the blower. In such an embodiment, the air intake may comprise a conductive portion, e.g. a conductive ring or a conductive interior surface, forming the counter-electrode. Location of the counter-electrode in this way facilitates a particularly compact design of the device of the present invention. Such location is made possible since the filter component is not located in between the air mover and particle charger, and indeed will often be external of, and remote to, the blower.

In the air cleaning apparatus, the housing may be in the form of a ducting or ductwork which may comprise the counter-electrode, or alternatively, may form the counter-electrode. An interior surface of the housing of the apparatus, preferably an interior surface adjacent to the electrode of the particle charger, may be provided with an electrically conductive coating or layer which functions as the counter-electrode. Alternatively, the housing of the apparatus may be formed of a suitably electrically conductive material, suitably insulated from external components. The tip/end of the electrode may be substantially co-axial with a longitudinal axis of the housing of the apparatus, i.e. with the longitudinal axis of the ductwork which extends in the overall direction of air flow.

The conductive interior surface of the counter-electrode as described herein as an option may be comprised of a conductive ink or paint. Conductive inks and paints offer a convenient way to apply a counter-electrode to otherwise non-conductive surfaces.

A device according to the first aspect of the invention may comprise two or more air movers and/or two or more particle chargers, each of the latter having an electrode arrangement for generating air ions in the air stream, i.e. two or more intimate couples in which the housing of one particle charger is hermetically sealed to the casing of one air mover, which may be provided in a side-by-side arrangement so as to effectively double the cross-sectional area available for air to be cleaned to move through. In such an arrangement, the two (or more) intimate couples may be used with a common filter, or with a filter each.

According to a fourth aspect of the present invention there is provided a method of removing aerosol particles from an air stream and eliminating charge bypass, the method comprising:

generating air ions in the air stream using a particle charger comprising a housing and an electrode arrangement therein;

electrically charging aerosol particles in the air stream via their collision with air ions in a particle charging zone of the particle charger; and moving the air stream towards a filter using an air mover comprising a casing, whereby electrically charged aerosol particles in the air stream are precipitated onto the filter, wherein the housing of the particle charger is hermetically sealed to the casing of the air mover in the direction of air flow, such that the air stream is moved through an intimate couple of the particle charger and the air mover, whereby all air to be cleaned has to pass through both the particle charger and the air mover, prior to its arrival at the filter.

The method of the fourth aspect of the invention is preferably achieved using an air cleaning device according to the first aspect of the invention.

According to a fifth aspect of the present invention there is provided a method of removing aerosol particles from an air stream and eliminating charge bypass, the method comprising:

generating air ions in the air stream using a housing comprising a first part of an electrode arrangement and a particle charger, located in the housing, comprising a second part of the electrode arrangement;

electrically charging aerosol particles in the air stream via their collision with air ions in a particle charging zone defined by the particle charger together with the housing; and moving the air stream towards a filter, located in the housing, using an air mover comprising a casing, located in the housing, whereby electrically charged aerosol particles in the air stream are precipitated onto the filter, wherein the housing provides a hermetic seal between the particle charger and the air mover in the direction of air flow, such that the air stream is moved through an intimate couple of the particle charger and the air mover, whereby all air to be cleaned has to pass through both the particle charger and the air mover, prior to its arrival at the filter.

The method of the fifth aspect of the invention is preferably achieved using an air cleaning apparatus according to the third aspect of the invention.

Preferred features described above in relation to the first and second aspects of the present invention also represent preferred features of the above third and fourth aspects of the present invention subject to a technical incompatibility that would prevent such a combination of preferred features. Furthermore, it will be evident to the skilled person that advantages set out above in respect of the first and second aspects of the present invention are also offered by the third and fourth aspects of the present invention.

For the avoidance of any doubt, it should be noted that various features of the invention discussed above may be used in combination, subject to a technical incompatibility that would prevent such a combination of preferred features. So, for example, in a specific embodiment of the present invention, the air mover is in the form of a blower and comprises a cylindrical intake formed of conductive material, the conductive material being earthed and forming a circular counter-electrode for the particle charger. In this embodiment, the tip/end of the emission electrode may be provided co-axially within the cylindrical intake, but separated from the counter-electrode by a clearance.

BRIEF DESCRIPTION OF THE DRAWINGS

The invention will now be further described, by way of example only, with reference to the accompanying drawings (not to scale), in which.

DETAILED DESCRIPTION

Figure 8:
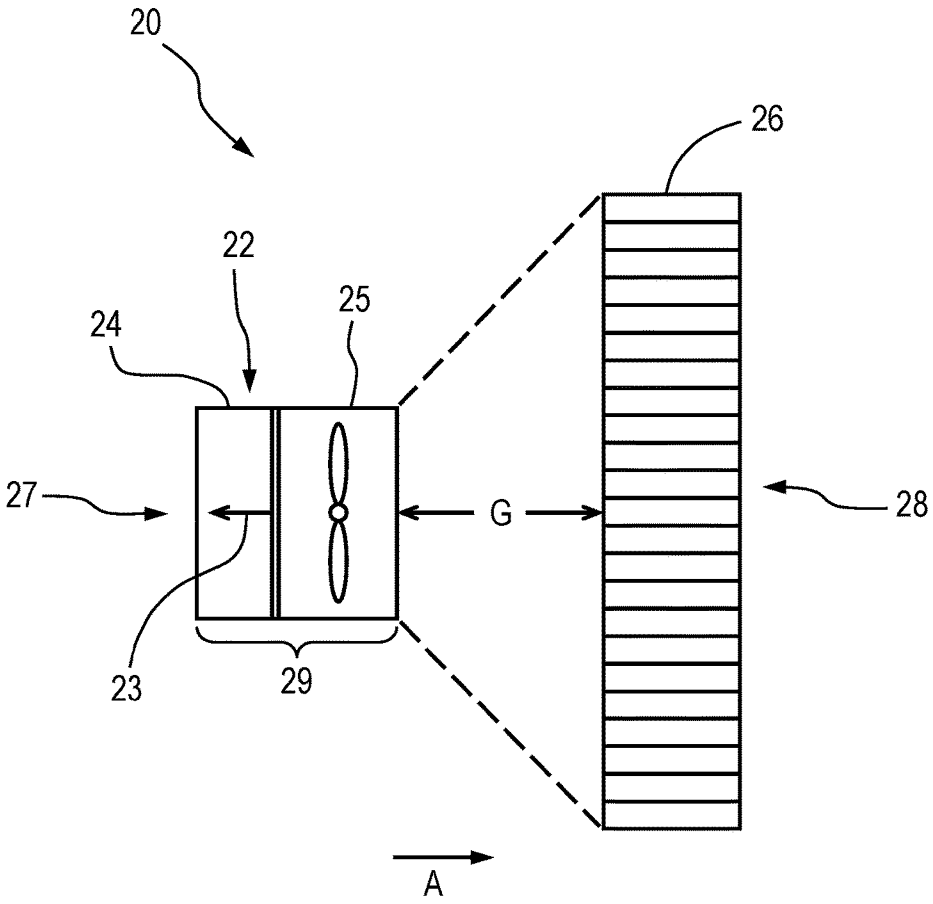
FIGS. 8 and 9 are schematic side cross sections of an embodiment of an electrostatic precipitation air cleaning device according to the present invention.
Figure 9:
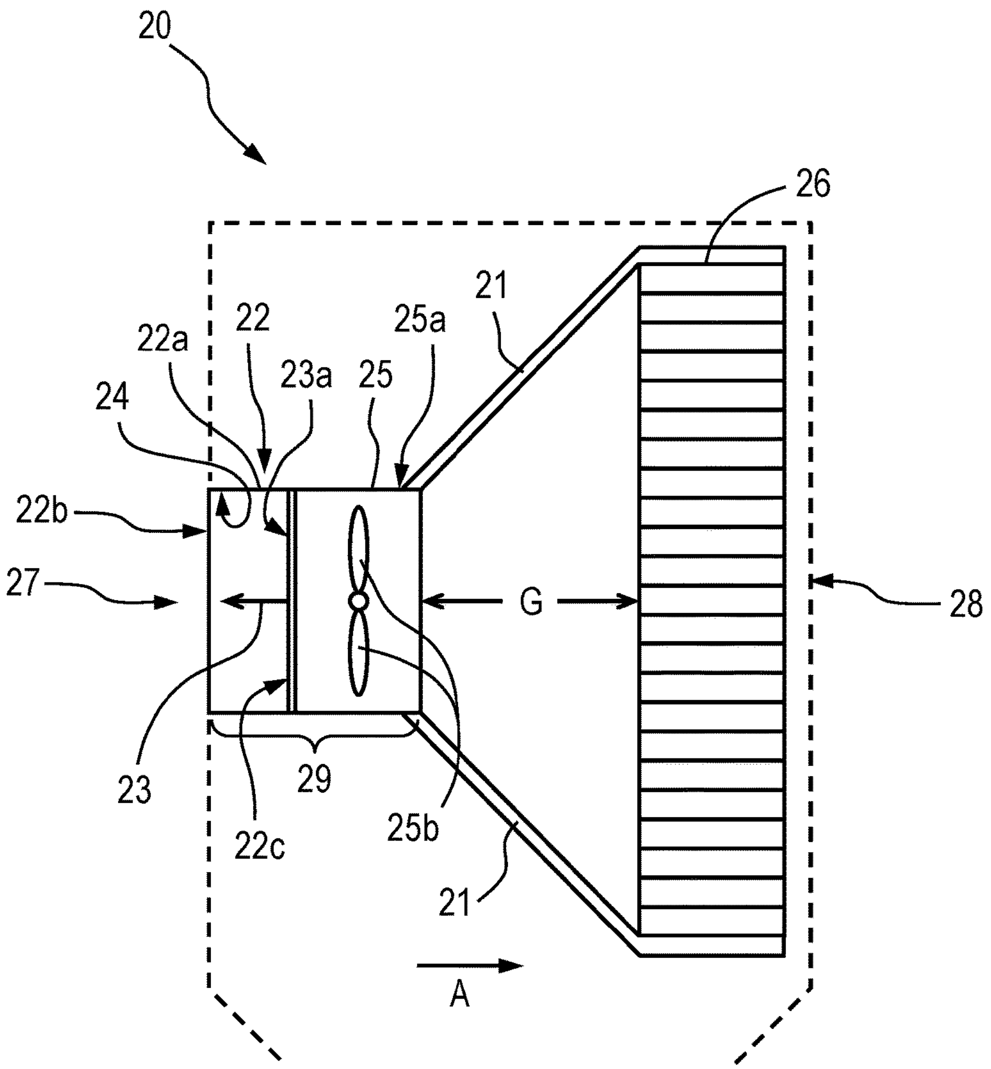

Referring to FIGS. 8 and 9, both of which illustrate a first embodiment of the invention, there is shown an electrostatic precipitation air cleaning device 20 for removing unwanted aerosol particles from an air stream. In a similar manner to the prior art device 10 shown in FIGS. 1 to 3, the air cleaning device 20 of FIGS. 8 and 9 comprises a particle charger 22, an air mover 25 in the form of a mechanical fan, and a filter 26 for removing charged aerosol particles from the air stream (not shown) as it flows through the device 20.

The particle charger 22 comprises a cylindrical housing 22*a* having an electrode arrangement therein for generating air ions in the air stream. The housing 22*a* is open at each of its airflow ends 22*b*, 22*c* so as to allow the air stream to pass through. The electrode arrangement comprises an electrode 23 in the form of a pin (represented by an arrow, the head of which points upstream to represent the tip of the pin) mounted centrally (lengthways) on a diametric bar 23*a* mounted in the housing 22*a*, and a counter-electrode 24 in the form of an annular conductive coating provided on the interior surface of the housing 22*a*, surrounding the electrode 23 in a concentric manner. A particle charging zone is the volume defined by the extent of electrical communication between the electrode 23 and counter-electrode 24 within which, in use, aerosol particles in the air stream are electrically charged via collision with the air ions.

The air mover 25 comprises a cylindrical casing 25*a* within which fan blades 25*b* are mounted (only two of which are shown for clarity). The cylindrical casing 25*a* of the fan 25 and the cylindrical housing 22*a* of the particle charger 22 are both made of a material that can be machined, injection-moulded or otherwise formed to a high dimensional precision, e.g. a plastics material such as PVC or a die-cast metal. The cylindrical casing 25*a* of the fan 25 is hermetically sealed to the cylindrical housing 22*a* of the particle charger 22 in the direction of air flow, whereby all air entering the device 20 has to pass through both the particle charger 22 and the air mover 25, such that charge bypass is eliminated.

Figure 1:
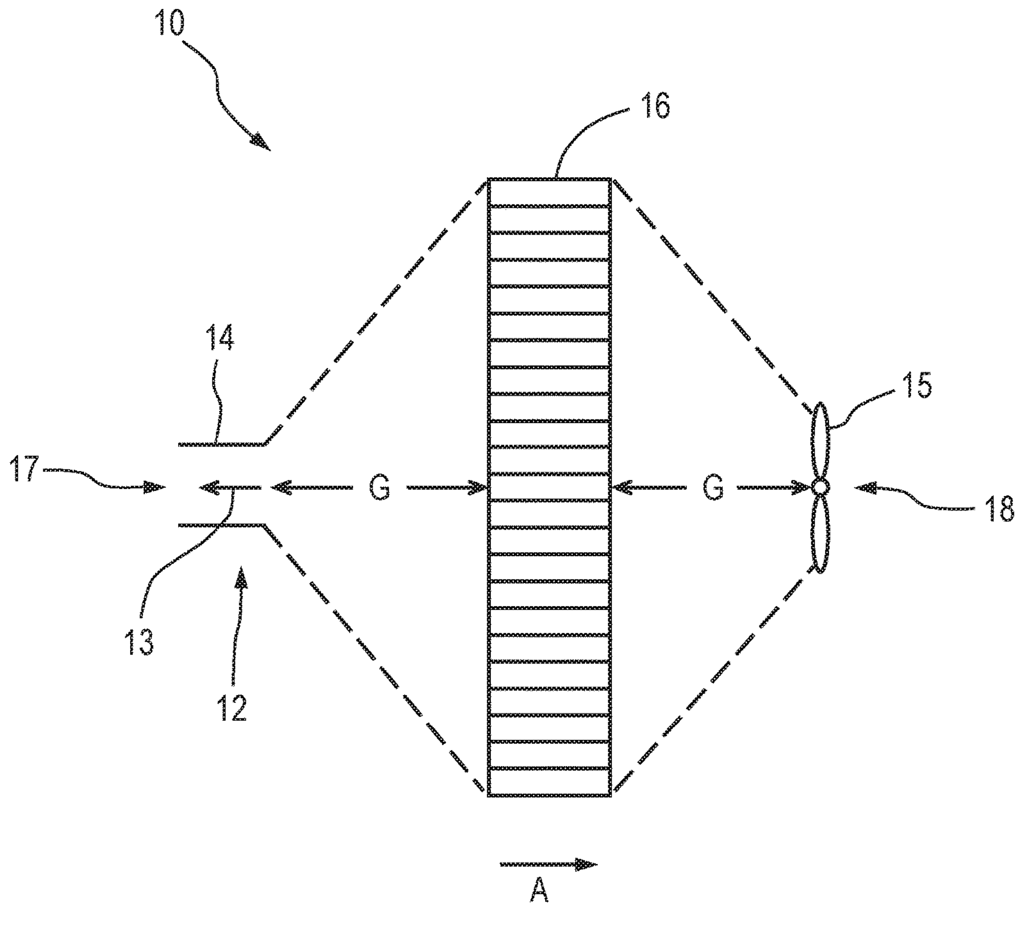
FIGS. 1 to 3 are schematic side cross sections of a prior art electrostatic precipitation device, discussed earlier in this specification.
Figure 2:
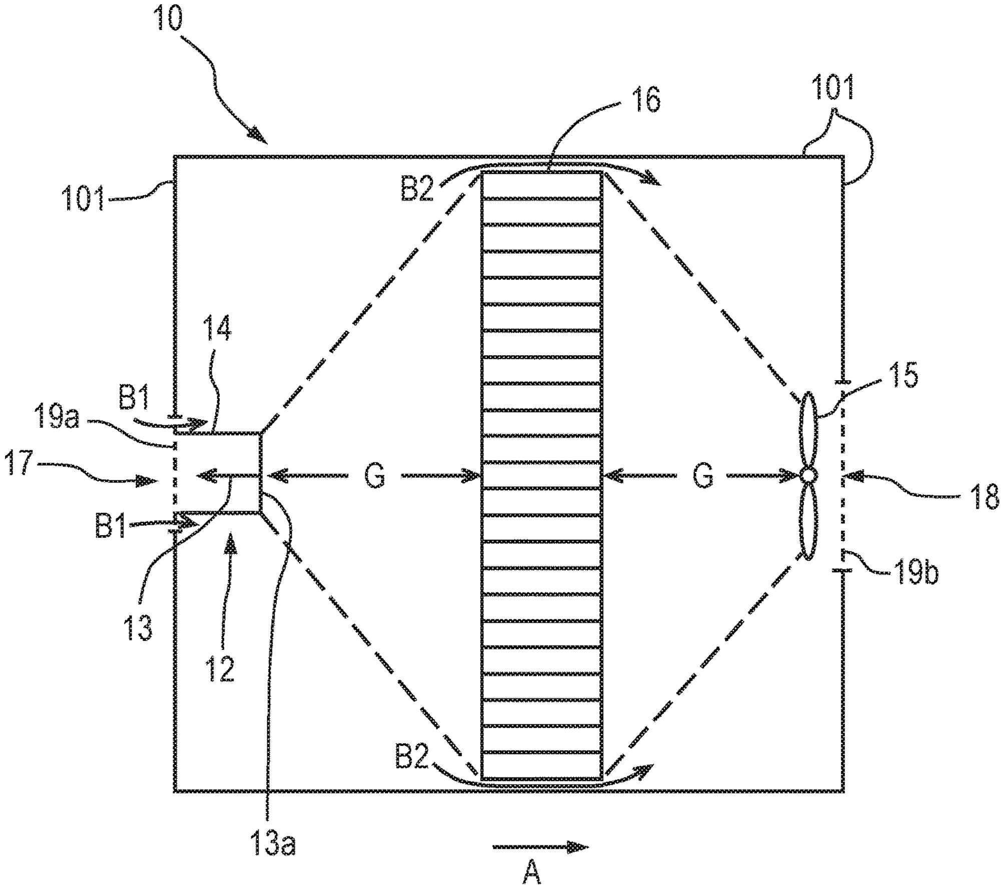
Figure 3:
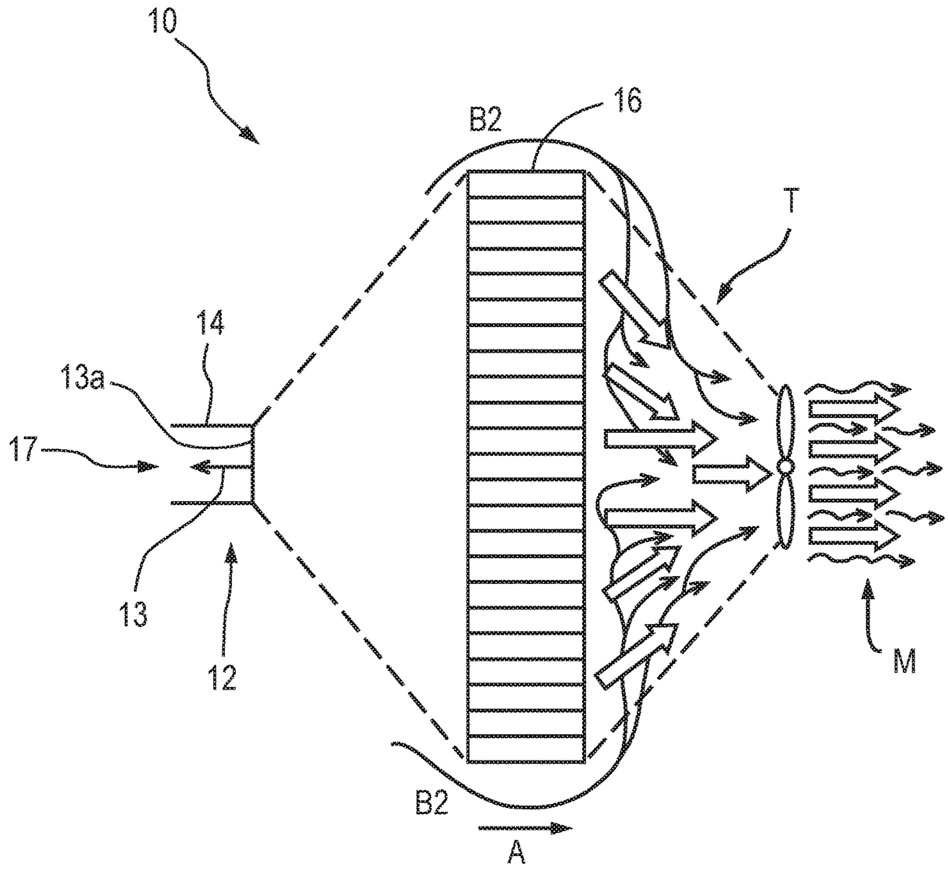
Figure 4:
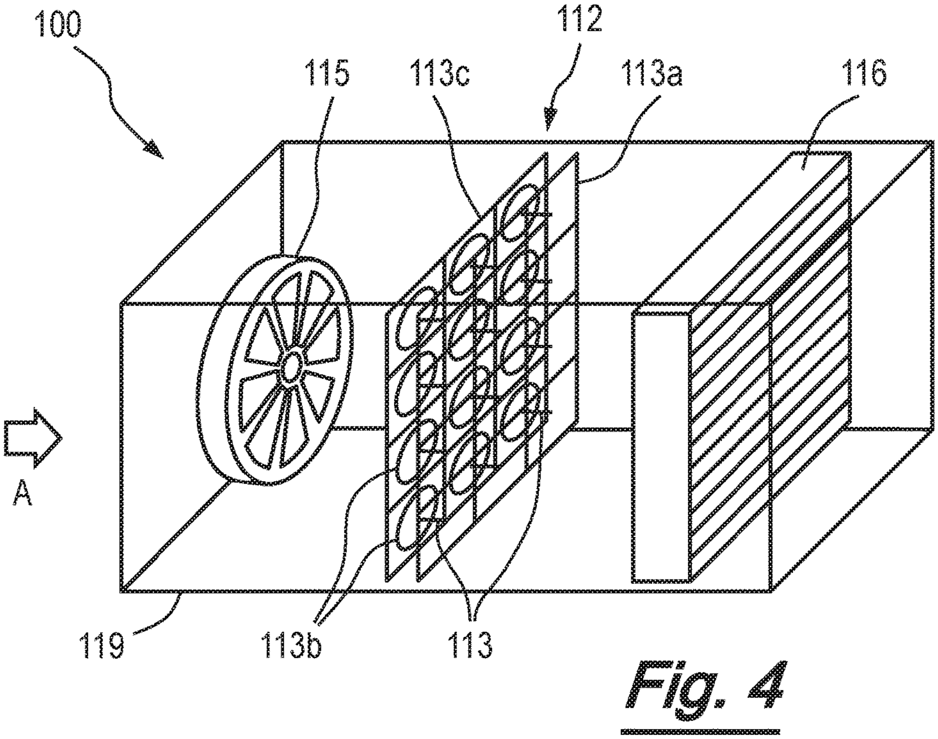
FIGS. 4 and 6 are schematic perspective views of two alternative prior art electrostatic precipitation apparatus, discussed earlier in this specification.

Unlike the device 10 shown in FIGS. 1 to 3, the order of the components and the relative spatial orientation of the components in the device 20 shown in FIGS. 8 and 9 is quite different: the particle charger 22 and the fan 25 are joined together in an airtight manner as an intimate couple 29, with the particle charger 22 being upstream of the fan 25. The air stream flows via an inlet 27 at the entrance to the particle charger 22, in the direction of arrow A, through the intimate couple 29 of particle charger 22 and fan 25, to the filter 26 via a gap, G, (illustrated by the dotted lines) therebetween and on to an outlet 28. In practice, this gap, G, would be contained by tapered cowling 21 or other such suitable ducting, as shown in FIG. 9.

In the device 20 in FIGS. 8 and 9, the particle charger 22 comprises a pin (corona) electrode 23, which is mounted centrally relative to a surrounding counter-electrode 24 so as to enable corona discharge from the tip of the pin and the generation of air ions for charging aerosol particles in the air stream in the manner discussed earlier in this specification.

As shown clearly in FIGS. 8 and 9, the particle charger 22 and the fan 25 are joined together in an airtight manner (a hermetic seal is formed) forming the intimate couple 29 upstream of the filter 26; there is no gap between the particle charger 22 and the fan 25, and although a gap, G, is shown as being present between the intimate couple 29 and the filter 26, it is under positive pressure with respect to ambient air and thus any bypass or leakage into the gap, G, (as a result of any imperfection in the cowling 21) of uncharged aerosol particles to the filter 26 is minimised, if not also completely eliminated.

In other words, unlike the prior art device 10 shown in FIGS. 1 to 3, the air stream passageway in the device 20 in FIGS. 8 and 9 undergoes only a single change in cross-sectional area (perpendicular to the direction of air flow) from the inlet 27 to the outlet 28. The passageway is relatively narrow (i.e. has a small cross-sectional area) at the inlet 27 of the device 20 to ensure that substantially all of the aerosol particles in the air flowing therethrough encounter air ions for charge transfer. Downstream of the particle charger 22 is provided the fan 25, and the passageway remains substantially constant in cross-section from the particle charger 22 to the fan 25, assisting formation of the intimate couple 29. Downstream of the fan 25, the passageway undergoes an expansion in cross-sectional area to accommodate the relatively large filter 26.

As there is only a single change in cross-sectional area of the air stream passageway, air passing through the device 20 in FIGS. 8 and 9 encounters less turbulence, air resistance, requires less energy and produces less noise; and the need for relatively costly cowling/ducting required to match the different cross sections as compared with the prior art device 1 in FIGS. 1 to 3 (which comprises two changes in cross sectional area of the gas passageway) is reduced.

The intimate couple of the particle charger 22 and the fan 25 is coupled to the filter 26 by means of cowling 21, which extends from an outlet of the fan casing **25*a* to the filter 26. Further external structure of the device 20, which is unimportant to the functioning components described above, is indicated schematically by the dotted lines shown in FIG. 9**.

Figure 10:
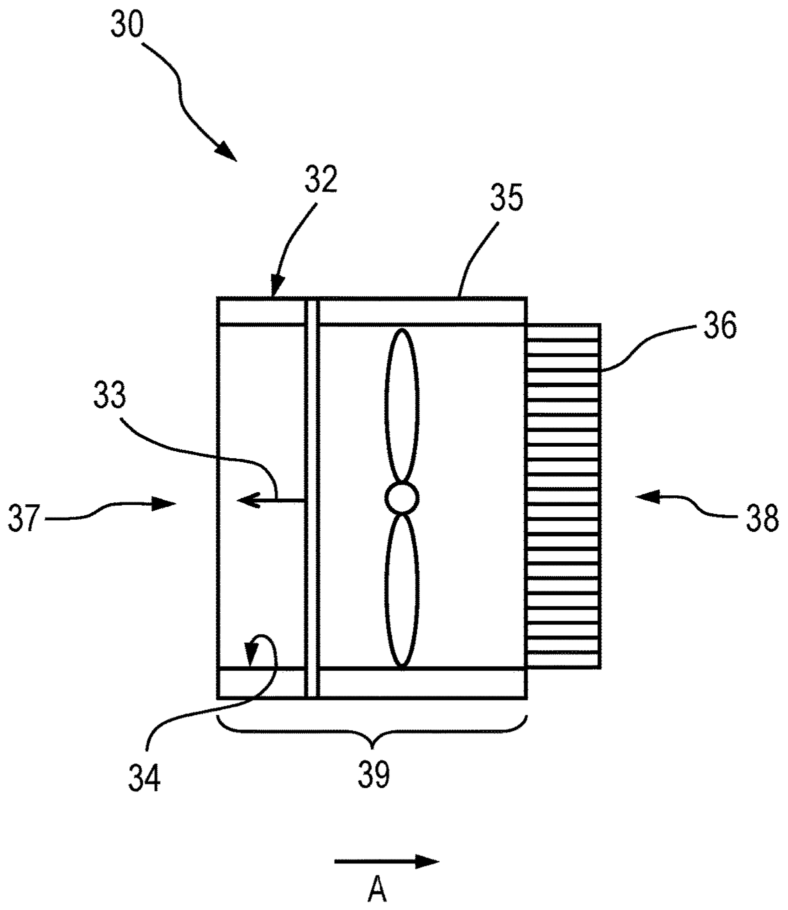
FIGS. 10, 11 and 12 are schematic side cross sections of a second embodiment of an electrostatic precipitation air cleaning device according to the present invention.
Figure 11:
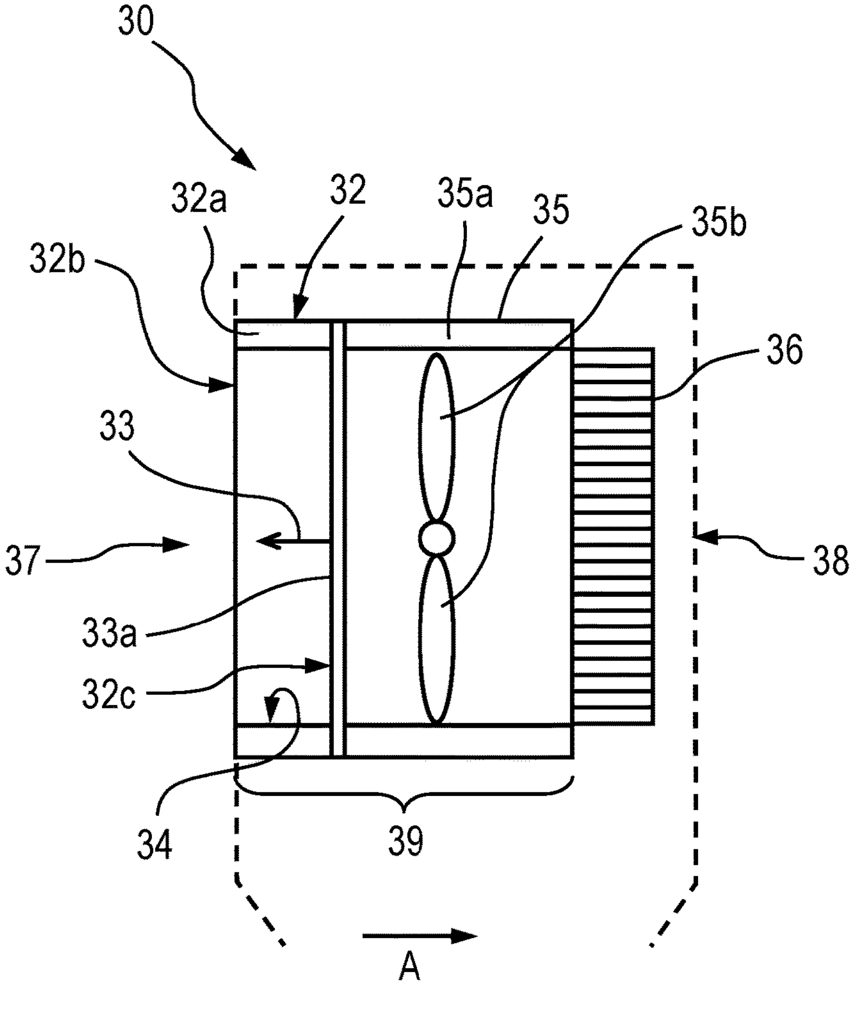
Figure 12:
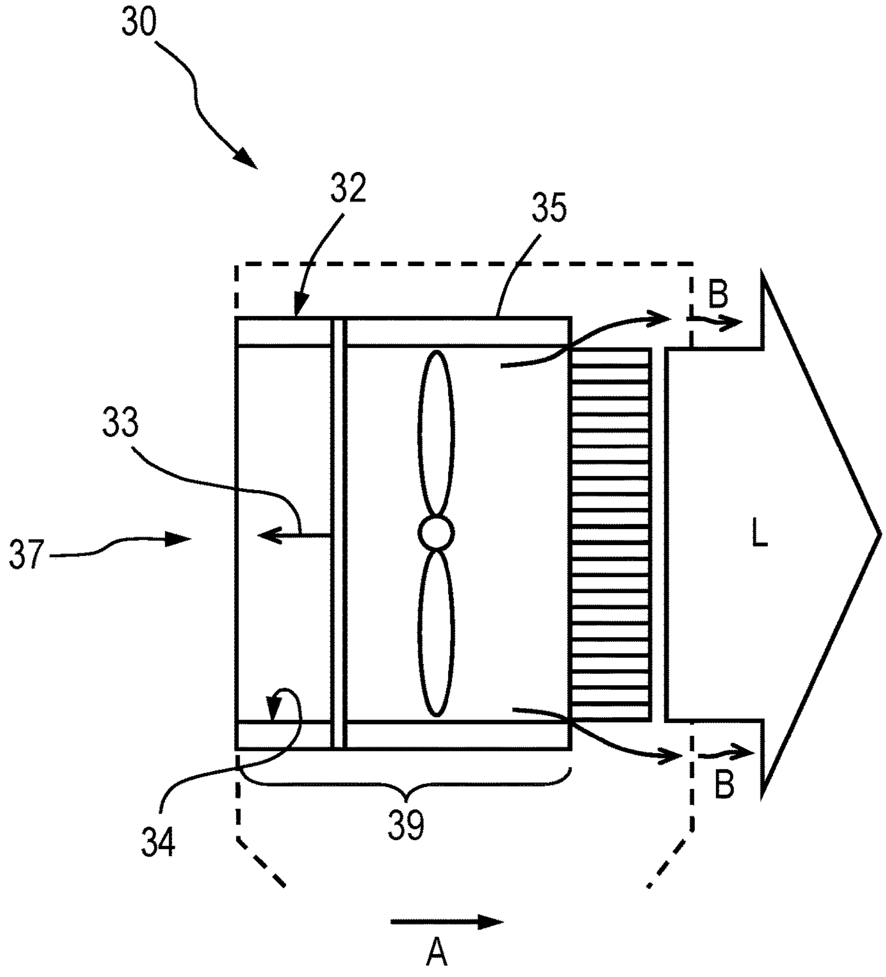

Referring now to FIGS. 10, 11 and 12, there is shown therein a second embodiment of an electrostatic precipitation air cleaning device 30 in accordance with the present invention for removing aerosol particles from an air stream. The device 30 of the second embodiment is similar to the first embodiment shown in FIGS. 8 and 9, and only the differences between the devices 20, 30 will be described in detail below. In FIGS. 10, 11 and 12, the components corresponding to those described above in relation to FIGS. 8 and 9 take the reference numbers used in FIGS. 8 and 9 but raised by 10.

Unlike the device 20 in FIGS. 8 and 9, because the filter 36 is sized such that its cross-section is the same as the cross-sectional area of the intimate couple 39 (formed by joining in an airtight manner of the particle charger 32 and the air mover in the form of a fan 35, such that the housing of the former is hermetically sealed to the casing of the latter), the air stream passageway in the device 30 in FIGS. 10, 11 and 12 undergoes no change in cross-sectional area from the inlet 37 to the outlet 38. As there is no change in cross-sectional area, air flowing through the device in FIGS. 10, 11 and 12 encounters less turbulence, air resistance, requires less energy and produces less noise; and there is no need for any relatively costly cowling/ducting to match different cross-sections as compared with the prior art device 10 shown in FIGS. 1 to 3 and with the device 20 according to the invention shown in FIGS. 8 and 9. Charge bypass is eliminated, filtration bypass and/or leakage is also reduced and particle charging efficiency and therefore capture is increased over and above that already achieved with the embodiment of the invention shown in FIGS. 8 and 9.

FIG. 12 shows a particular effect achievable with the present invention when charge bypass is eliminated, even though there may still be an amount of filtration bypass (because air filters must be designed to be removed from an air cleaner for replacement or cleaning and therefore the fit between the filter frame and the surrounding housing or ductwork is necessarily a sliding fit with inevitable bypass). Air is drawn through the particle charging zone such that charging of aerosol particles therein occurs. After passing through the fan 35, the air is in a positive pressure region and is blown through the filter 36 (and outlet grille, not shown) to produce a smooth laminar flow of air, represented by arrow L, which is of particular use when it can be directed toward the face of the user. The effect is particularly pronounced when the filter 36 is an electrostatic filter, such as is described in International patent publication WO00/61293. All of the charged particles passing through the filter are filtered out, and if there is any small leakage of bypass air (shown by arrows B) around the sides of the filter 36, this is not mixed with, and does not impact the laminar flow of, air exiting the filter 36. The user is subject to the full benefits of the particle-free air issuing from the filter 36. Such an effect is in direct contrast to most prior art portable air cleaners, such as is exemplified in FIGS. 1 to 3, which are designed with the fan downstream of the filtration means (whether that be an ion charger and filter combination or solely a filter). This results in the filtration means being under negative pressure with respect to the ambient air, which means that uncharged, unfiltered air (bypass air) is drawn through gaps or joints into the air cleaner at any or all of the coupling points. Bypass air (for example originating from around the removable filter) is drawn into the turbulent (negative pressure) region downstream of the fan where it is mixed with the clean air being drawn through the filter. Air blown out by the fan, in this common design of prior art air cleaner, is often at high velocity, is non laminar, is uncomfortable when blown at a personal user and is contaminated by this unfiltered air. Overall particle removal efficiency as measured between air into the air cleaner and out of the fan is often significantly reduced. The embodiment of the invention shown in FIGS. 10, 11 and 12 overcomes these prior art disadvantages.

Figure 13:
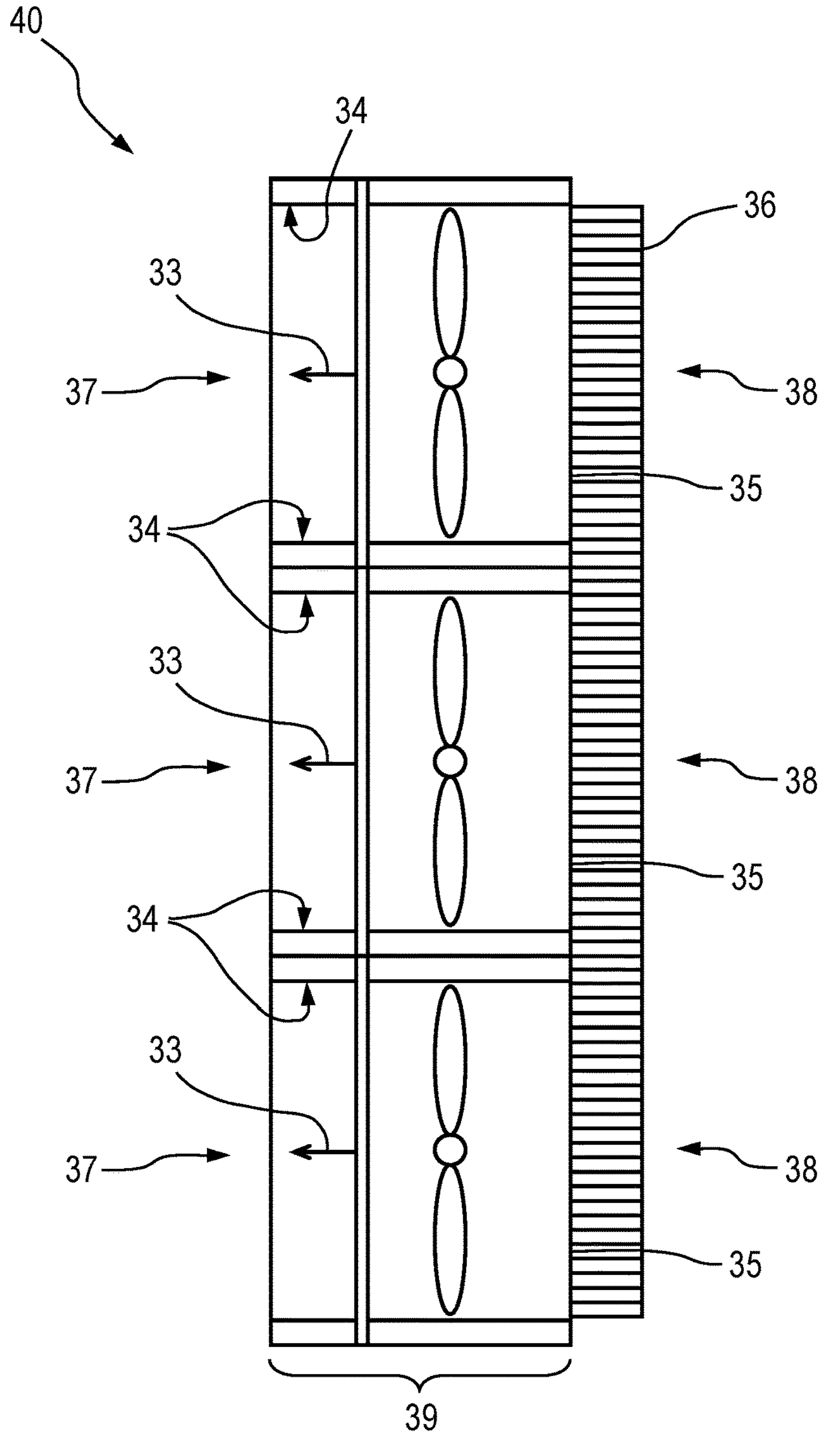
FIGS. 13 and 14 are schematic side cross sections of a third embodiment of an electrostatic precipitation air cleaning device according to the present invention.
Figure 14:
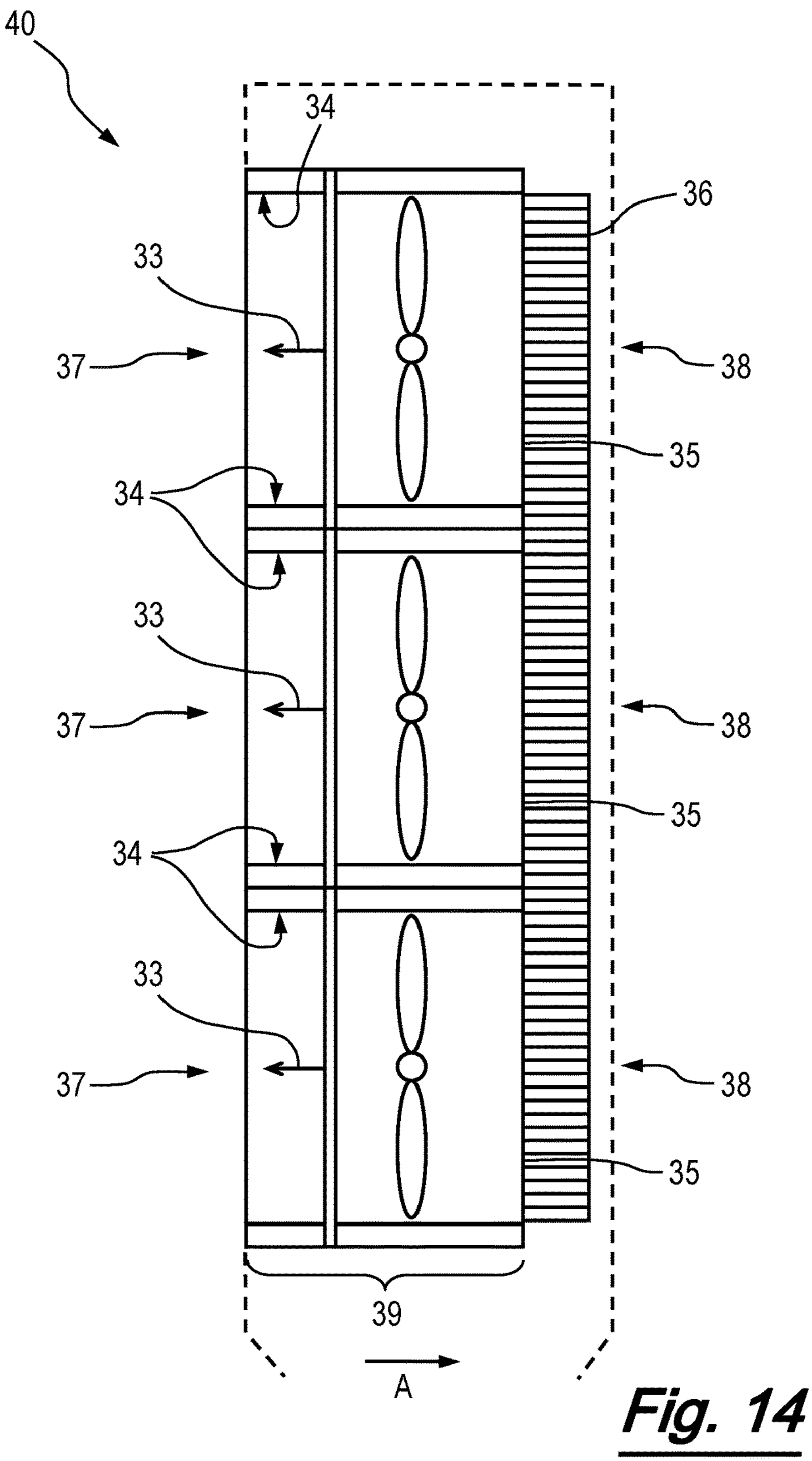

Referring now to FIGS. 13 and 14, there is shown therein a further electrostatic precipitation air cleaning device 40 in accordance with the present invention for removing aerosol particles from an air stream. The device 40 of the third embodiment is effectively a stack of three of the devices 30 shown in FIGS. 10, 11 and 12, and as such the same reference numbers as those used to describe FIGS. 10, 11 and 12 will be used in FIGS. 13 and 14.

Three particle chargers 32, each having a pin electrode 33, and three air movers in the form of mechanical fans 35 are provided upstream of a single filter 36 in the device in FIGS. 13 and 14 (cf one of each respective component in the devices 20, 30 in FIGS. 8 and 9, and FIGS. 10, 11 and 12), i.e. three intimate couples 39 are provided upstream of the single filter 36. The presence of a single filter, spanning the three intimate couples 39, rather than three separate filters (one per couple) is the only modification made as compared to an exact stack of three of the devices 30 shown in FIGS. 10, 11 and 12. Of course, the embodiment shown in FIGS. 13 and 14 could be so modified such that the filter 36 spanned just two of the intimate couples 39 (with the third couple being provided with its own filter), or such that each intimate couple is provided with its own filter. All of these combinations are within the scope of the present invention.

The three particle chargers 32 are provided in the air stream passageway in a side-by-side arrangement (in this case, stacked one on top of the other), such that air flowing through the device encounters one or the other two particle chargers 32. Similarly, the three fans 35 are also provided in a side-by-side arrangement (again stacked one on top of the other and each being substantially co-axial with a respective particle charger 32), such that air flowing through the device 40 is drawn through one or the other two fans 35.

In use, some air flowing through the air stream passageway flows through the uppermost particle charger 32 and uppermost fan 35 to the common filter 36, some through the middle particle charger 32 and middle fan to the common filter 36, and some through the lowermost particle charger 32 and the lowermost fan 35 to the common filter 36.

Each of the three particle chargers 32 has a similar cross-sectional area to each of the three fans 35, and so the total air stream passageway therebetween remains substantially constant in cross-sectional area. The collective cross-sectional area of the three particle chargers 32 and three fans 35 is similar to that of the single filter 36, (i.e. the filter 36 has a cross-sectional area approximately three times that of each intimate couple 39). Because of the similarity in cross-sectional area, the air stream passageway between the fans 35 and the filter 36 remains substantially constant in cross-section.

In light of the above, as with the device in FIGS. 10, 11 and 12, the air stream passageway in the device in FIGS. 13 and 14 undergoes substantially no change in cross-sectional area from its inlets 37 to its outlets 38. As there is substantially no change in cross-sectional area, air passing through the device 40 in FIGS. 13 and 14 encounters less turbulence, air resistance, requires less energy and produces less noise; there is no need for relatively costly connecting tubes required to match the different cross sections as compared with the devices 20, 30 in FIGS. 8 and 9, and 10, 11 and 12. As shown, the common filter 36 is fitted to the downstream end of the three intimate couples 39 by means of a straightforward housing (not shown). Thus charge by[pass is eliminated, filtration bypass and/or leakage is also reduced and particle charging efficiency and therefore capture is increased over and above that already achieved with the embodiment of the invention shown in FIGS. 8 and 9.

Figure 15:
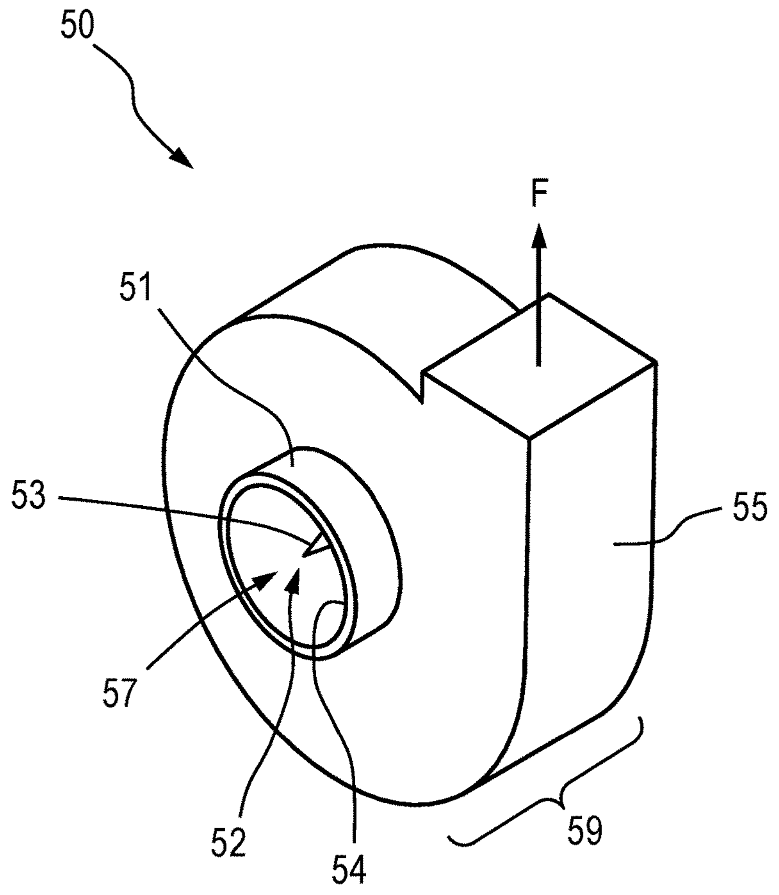
FIGS. 15 and 16 are schematic perspective views of a fourth embodiment of an electrostatic precipitation air cleaning device according to the present invention.
Figure 16:
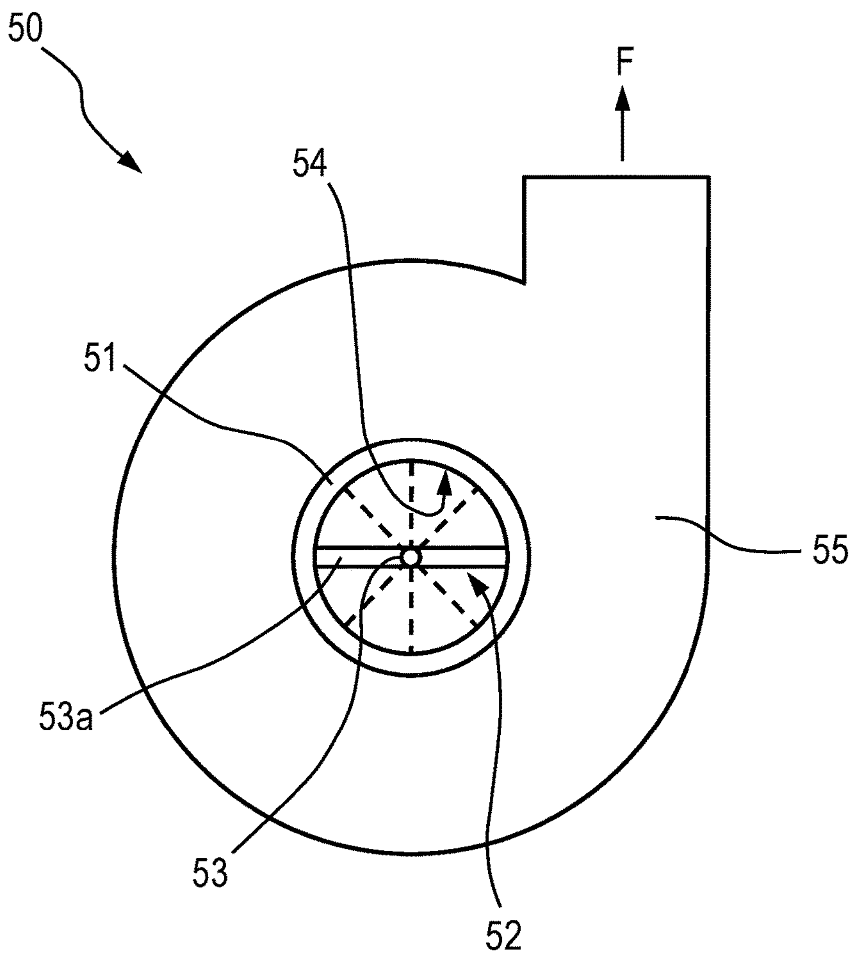

Referring now to FIGS. 15 and 16, there is shown therein a further electrostatic precipitation air cleaning device 50 in accordance with the invention for removing aerosol particles from an air stream. The device 50 comprises a particle charger 52, an air mover 55 in the form of a blower, and a filter, which although not explicitly shown here, would be positioned downstream of the air flow exiting the blower 55, which air flow is labelled with arrow F.

The particle charger 52 and the blower 55 are joined together (hermetically sealed together) in an airtight manner as an intimate couple 59, with the particle charger 52 being upstream of the blower 55. The air stream flows via an inlet 57 at the entrance to the particle charger 52, through the intimate couple 59 of particle charger 52 and blower 55, to the filter (somewhere downstream of air flow shown by arrow F) and on to an outlet (not shown). In practice, cowling or other such suitable ducting would be provided to position the filter externally of the blower 55.

Figure 5:
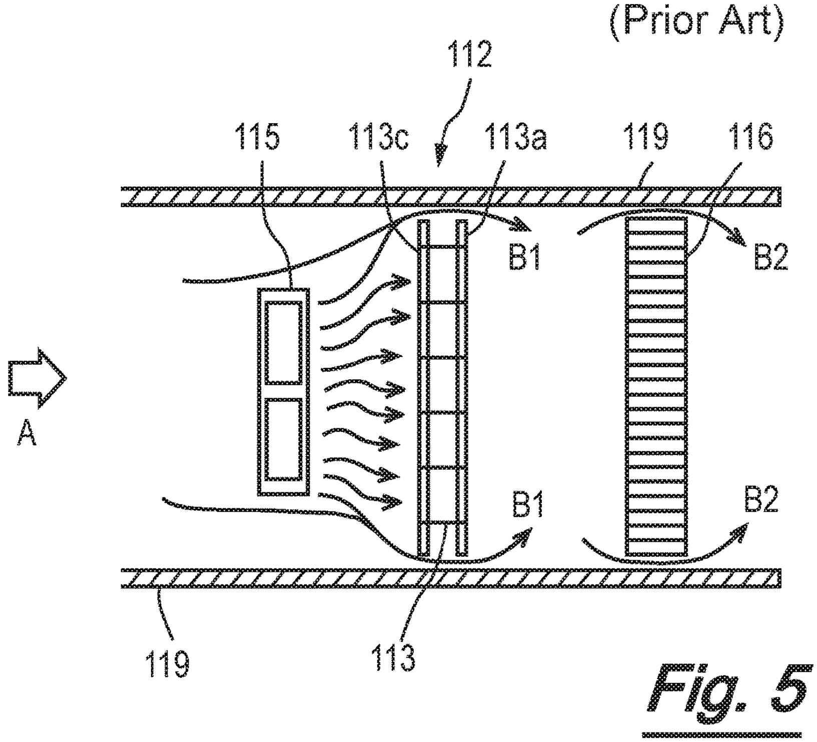
FIGS. 5 and 7 are schematic side cross-sections of each of the two alternative prior art electrostatic precipitation apparatuses shown in FIGS. 4 and 6 respectively.
Figure 6:
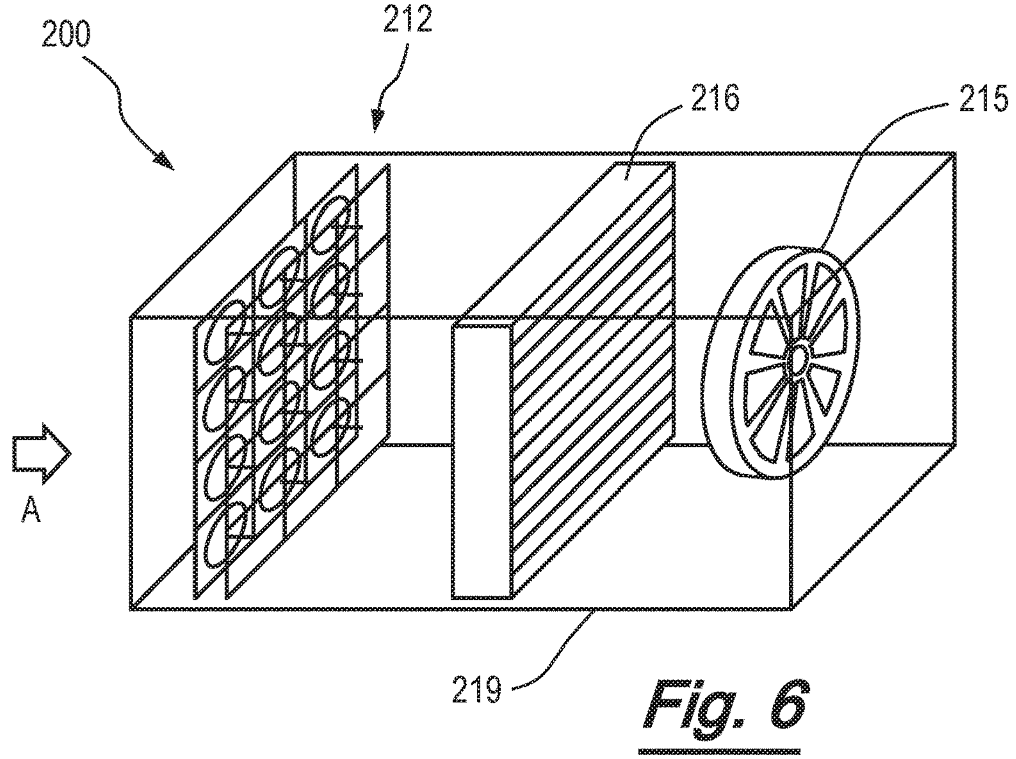
Figure 7:
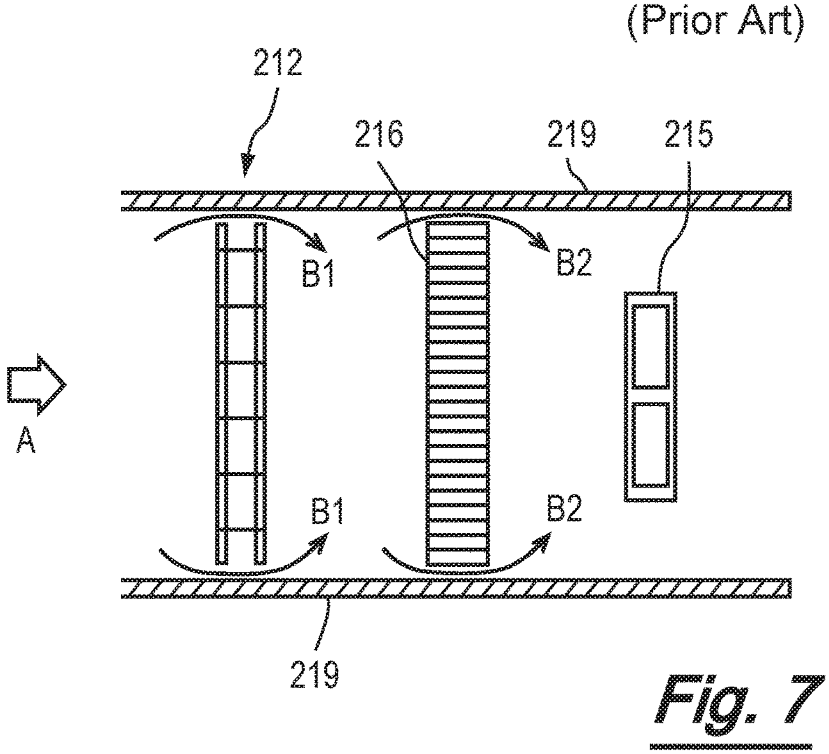

More specifically in FIGS. 15 and 16, the particle charger 52 comprises a pin (corona) electrode 53 mounted centrally on a diametric rod 53*a* which is mounted in an intake (air inlet section) 51 of the blower 55. The intake 51 is conductive and earthed, and as a result the intake 51 behaves as a counter-electrode (also referenced as 54 hereinafter) for the pin electrode 53, thereby improving particle charging effectiveness. The intake 51 is shown as a protruding member in FIG. 5, however it could easily be in the form of an opening in the otherwise flat outer surface of the side of the blower 55. The intake 51, whether in the form of a protrusion (as shown) or a flush opening (as an alternative) can itself be conductive (as described above) or, if formed of a non-conductive material, e.g. a plastics material, be provided with a conductive interior surface, e.g. an area, preferably a ring, of conductive ink or paint to form the counter-electrode. The intake 51 of the blower 55 is substantially cylindrical, meaning that the counter-electrode 54 is similarly cylindrical, whereas the tip of the pin electrode 53 is substantially a point. The cylindrical counter-electrode 54 and tip of the pin electrode 53 are, therefore, symmetrically arranged, which means, in combination with the pin electrode 53 and the counter-electrode 54 being concentric, that the distance from the pin tip to the inner surface of the surrounding electrode is approximately constant. This means that the air ion flux between the pin electrode 53 and the surrounding counter-electrode 54 is radial, thereby increasing the likelihood of air ion-aerosol particle collisions, which further improves particle charging effectiveness by the corona electrode 53 and eliminates charge bypass.

Test Data

An electrostatic air precipitation device, of the type schematically shown in FIGS. 10, 11 and 12 of the accompanying drawings, was tested for its aerosol particle capture efficiency by varying the current supplied to the pin emission electrode of the particle charger as a function of captured particle size. Air flow to the device was controlled at 1.2 meters per second filter face velocity for all tests. The filter used was an electrostatic, fluted "ifD filter" of 3 inches (76.2 mm) depth supplied by Darwin Technology International Limited (www.ifdair.com); the ifD filter was operated at 10 kV between adjacent electrodes. The number of particles was measured using a laser particle counter (Lighthouse Handheld Model No. 3016) which was operated consistently so that a % particle capture efficiency could be calculated. The results are shown in Table 2 below.

TABLE 2

| Current Supplied | Captured Particle Size (μm) | | | | | |
|---|---|---|---|---|---|---|
| (μA) | 0.3 | 0.5 | 0.7 | 1.0 | 2.0 | 5.0 |
| 1.0 | 99.35 | 99.46 | 99.26 | 99.59 | 99.03 | 100.00 |
| 2.0 | 99.88 | 99.92 | 99.94 | 99.88 | 100.00 | 100.00 |
| 3.0 | 99.95 | 100.00 | 100.00 | 100.00 | 100.00 | 100.00 |
| 4.0 | 99.99 | 100.00 | 100.00 | 100.00 | 100.00 | 100.00 |
| 5.0 | 100.00 | 100.00 | 100.00 | 100.00 | 100.00 | 100.00 |

The percentage particle capture efficiencies noted in Table 2 above clearly show a general trend of increasing efficiency with increased current supplied, for each of the particle sizes captured, and increasing efficiency with which increasingly large particles are captured for a given current supplied (subject to experimental error).

Larger aerosol particles are generally easier to capture than smaller particles (due in part to there being a greater likelihood of collision of larger particles with air ions and thus more charged particles to capture). However, even with aerosol particle sizes as small as 0.3 μm, with only 1.0 μA of current supplied to the pin-type electrode, greater than 99% (99.35%) efficiency is achieved, this rising to 99.99% with 4.0 μA of current supplied.

It should of course be noted that all of the efficiencies quoted are subject to the operational measurement limitations of the particle counter.

Figure 17:
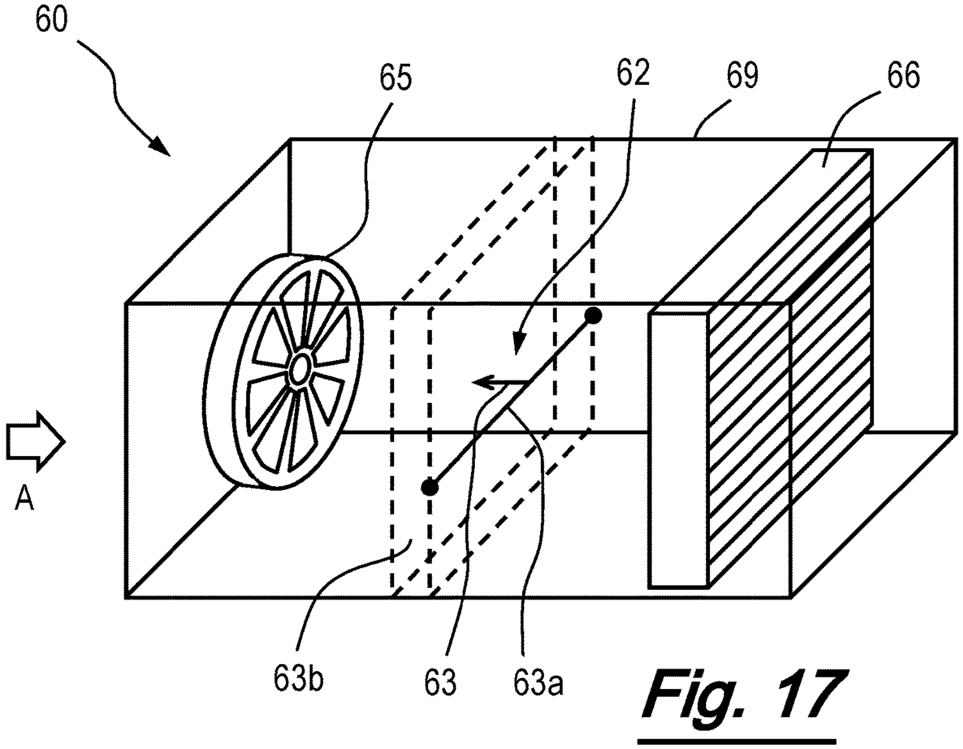
FIG. 17 is a schematic perspective view of an embodiment of an electrostatic precipitation apparatus according to the invention.
Figure 18:
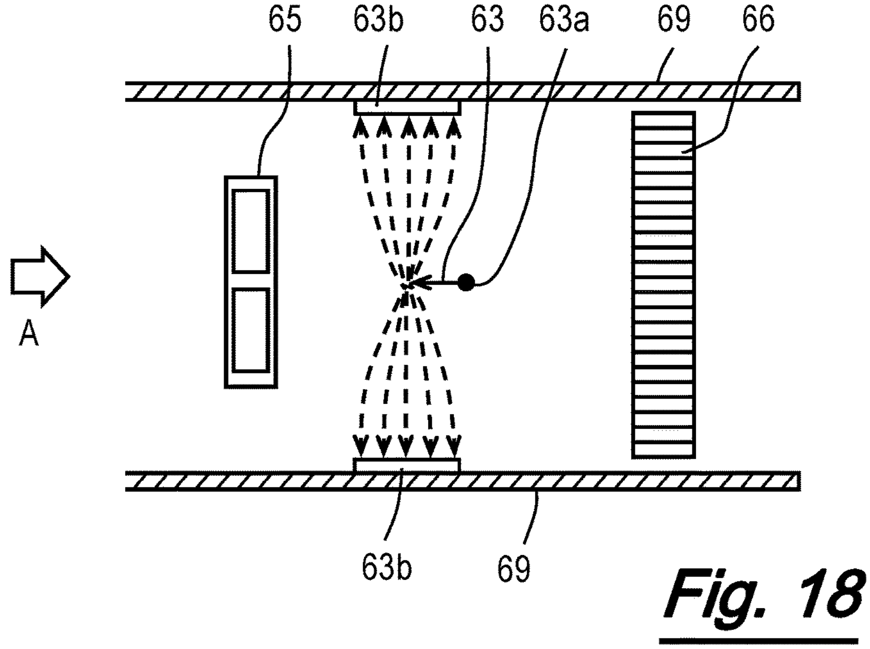
FIG. 18 is a schematic cross-section of the electrostatic precipitation apparatus shown in FIG. 17.

Referring now to FIGS. 17 and 18, there is shown an embodiment of an air cleaning apparatus according to the invention, which may form part of an HVAC system.

Electrostatic precipitation apparatus 60 is designed to remove unwanted aerosol particles from an air stream with high efficiency (typically 99.99%) and comprises an air mover 65 in the form of a mechanical fan, a particle charger 62, and a filter 66 for removing charged aerosol particles from the air stream ("dirty air") (not shown) as it flows through the apparatus 60 in the volume defined by ductwork 69, in the direction of arrow A, through the filter 66, to an outlet (not shown) downstream of the filter 66. Each of the particle charger 62, the fan 65 and the filter 66 is provided within the ductwork 69, i.e. a housing to accommodate said components.

The particle charger 62 comprises an electrode in the form of a single pin 63 mounted centrally along the length of a rod 63*a* that is electrically coupled to a surrounding counter-electrode 63*b* formed on the interior surface of a portion of the ductwork 69 in the region of the pin 63 so as to enable corona discharge from the tip of the pin 63 and the generation of air ions for charging aerosol particles in the air stream in the manner discussed earlier in this specification. The pin 63 is illustrated in as an arrow which the arrowhead representing the tip of the pin. The counter-electrode 63*b* is shown in dotted outline and is formed from conductive ink or paint applied directly to the interior surface of the ductwork 69. Alternatively, the ductwork 69 itself may be made of a suitably conductive material. The rod 63*a* on which the pin 63 is mounted is fitted into the ductwork 69 by any conventional fixing means, including, for example, gluing, soldering, welding, etc.

As shown clearly in FIGS. 17 and 18, the particle charger 62 and the fan 65 are provided upstream of the filter 66. Because the particle charger 62 and the ductwork 69 together form the particle charging zone (having air ion flow lines shown by the dotted arrows in FIG. 18) within which aerosol particles will be electrically charged, and because the ductwork 69 provides a hermetic seal between the particle charger 62 and the fan 65 in the direction of air flow, all air entering the apparatus 60 via the ductwork 69, has to pass through both the particle charger 62 and the fan 65, such that charge bypass is eliminated.

Of course, the order of the components shown could be altered, in that the relative positions of the particle charger 62 and fan 65 could be exchanged so that the fan 65 is downstream of the particle charger 62 (but still upstream of the filter 66). The position of the counter-electrode 63*b* would also need to be moved to match the position of the particle charger 62, unless a greater proportion of the interior surface of the ductwork 69 were to be made conductive, or if the ductwork 69 per se was conductive. The effect of elimination of charge bypass would nonetheless be the same.

It will be appreciated that certain features of the invention, which are for clarity described separately, particularly those in the context of alternative embodiments, may also be provided in combination in a single embodiment. Conversely, various features of the invention which are described in combination, in the context of a single embodiment, may also be provided separately, or in any suitable combination.

It will also be appreciated that various modification, alterations and/or additions to the described embodiments may be introduced without departing from the scope of the present invention, as defined in the following claims. Many other possible modifications would be appreciated by one of skill in the art following the teaching in this description.

What is claimed is:

1. An air cleaning device for removing aerosol particles from an air stream, the device comprising:

(a) a particle charger comprising a housing and an electrode arrangement therein for generating air ions in the air stream, the particle charger having a particle charging zone within which, in use, aerosol particles in the air stream are electrically charged via collision with the air ions;

(b) a filter for precipitating electrically charged aerosol particles from the air stream moving through the device; and (c) an air mover, comprising a casing as a separate component from the housing, for moving the air stream through the device;

wherein the particle charger and the air mover are provided upstream of the filter; and wherein the housing of the particle charger is hermetically sealed to the casing of the air mover in the direction of air flow through the device, such that the particle charger and the air mover are intimately coupled together to provide a minimum 99.9% particle removal efficiency, whereby essentially all air entering the device has to pass through both the particle charger and the air mover.

2. The air cleaning device according to claim 1, wherein the particle charger is upstream of the air mover.

3. The air cleaning device according to claim 1, wherein the particle charger is down stream of the air mover.

4. The air cleaning device according to claim 1, wherein the filter is an electrostatic filter, an electrostatic precipitator, a fibrous media filter, or an electret filter.

5. The air cleaning device according to claim 1, wherein the air mover is a mechanical fan, bellows, a convective airflow device, a centrifugal fan, or a blower.

6. The air cleaning device according to claim 1, wherein the electrode arrangement comprises two parts: an electrode and a counter-electrode.

7. The air cleaning device according to claim 6, wherein the particle charger comprises both the electrode and the counter-electrode.

8. The air cleaning device according to claim 6, wherein the electrode is in the form of a pin or elongate wire, having a tip or an end.

9. The air cleaning device according to claim 8, wherein the electrode of the particle charger is supported on a support rod.

10. The air cleaning device according to claim 9 wherein two or more pin-type electrodes are supported on a common conductor rod.

11. The air cleaning device according to claim 6, wherein the counter-electrode surrounds the electrode but is separated therefrom by a clearance.

12. The air cleaning device according to claim 11, wherein the electrode is substantially concentric with the counter-electrode.

13. The air cleaning device according to claim 6, wherein the counter-electrode is comprised of a plate having an aperture therein.

14. The air cleaning device according to claim 6, wherein the counter-electrode comprises a hollow cylinder formed of conductive material or having a conductive interior surface.

15. The air cleaning device according to claim 14, wherein the conductive interior surface is comprised of a conductive ink or paint.

16. An air cleaning method for removing aerosol particles from an air stream and eliminating charge bypass, the method comprising:

generating air ions in the air stream using a particle charger comprising a housing and an electrode arrangement therein;

electrically charging aerosol particles in the air stream via their collision with air ions in a particle charging zone of the particle charger;

moving the air stream towards a filter using an air mover comprising a casing as a separate component from the housing, whereby electrically charged aerosol particles in the air stream are precipitated onto the filter, using a hermetic seal between the housing of the particle charger and the casing of the air mover in the direction of air flow, such that the air stream is moved through an intimate couple of the particle charger and the air mover to provide a minimum 99.9% particle removal efficiency, whereby all air to be cleaned has to pass through both the particle charger and the air mover, prior to its arrival at the filter.

* * * * *